United States Patent
Kolotienko et al.

(10) Patent No.: US 10,078,688 B2
(45) Date of Patent: Sep. 18, 2018

(54) EVALUATING TEXT CLASSIFIER PARAMETERS BASED ON SEMANTIC FEATURES

(71) Applicant: ABBYY InfoPoisk LLC, Moscow (RU)

(72) Inventors: Sergey Kolotienko, Moscow (RU); Konstantin Anisimovich, Moscow (RU)

(73) Assignee: ABBYY Production LLC, Moscow (RU)

( * ) Notice: Subject to any disclaimer, the term of this patent is extended or adjusted under 35 U.S.C. 154(b) by 0 days.

(21) Appl. No.: 15/157,722

(22) Filed: May 18, 2016

(65) Prior Publication Data

US 2017/0293687 A1    Oct. 12, 2017

(30) Foreign Application Priority Data

Apr. 12, 2016   (RU) ................................ 2016113866

(51) Int. Cl.
| | | |
|---|---|---|
| *G06F 17/30* | (2006.01) | |
| *G06F 17/27* | (2006.01) | |
| *G06F 17/28* | (2006.01) | |

(52) U.S. Cl.
CPC ...... *G06F 17/30731* (2013.01); *G06F 17/271* (2013.01); *G06F 17/2725* (2013.01); *G06F 17/2785* (2013.01); *G06F 17/28* (2013.01)

(58) Field of Classification Search
CPC .. G06F 17/30731; G06F 17/271; G06F 17/28; G06F 17/2785; G06F 17/2725
See application file for complete search history.

(56) References Cited

U.S. PATENT DOCUMENTS

| | | |
|---|---|---|
| 5,675,710 A | 10/1997 | Lewis |
| 5,991,709 A | 11/1999 | Schoen |
| 7,376,635 B1 | 5/2008 | Porcari et al. |
| 7,499,591 B2 | 3/2009 | Simske et al. |
| 7,644,057 B2 | 1/2010 | Nelken et al. |
| 7,752,159 B2 | 7/2010 | Nelken et al. |
| 7,792,353 B2 | 9/2010 | Forman et al. |
| 7,937,345 B2 | 5/2011 | Schmidtler et al. |
| 8,713,007 B1 | 4/2014 | Korolev et al. |
| 8,996,350 B1 | 3/2015 | Dub et al. |
| 9,104,972 B1 | 8/2015 | Korolev et al. |
| 2004/0225653 A1 | 11/2004 | Nelken et al. |

(Continued)

*Primary Examiner* — Qian Yang

(74) *Attorney, Agent, or Firm* — Lowenstein Sandler LLP

(57) ABSTRACT

Systems and methods for evaluating text classifier parameters based on semantic features. An example method comprises: performing a semantico-syntactic analysis of a natural language text of a corpus of natural language texts to produce a semantic structure representing a set of semantic classes; identifying a natural language text feature to be extracted using a set of values of a plurality of feature extraction parameters; partitioning the corpus of natural language texts into a training data set comprising a first plurality of natural language texts and a validation data set comprising a second plurality of natural language texts; determining, in view of the category of the training data set, the set of values of the feature extraction parameters; validating the set of values of the feature extraction parameters using the validation data set.

16 Claims, 15 Drawing Sheets

(56) References Cited

U.S. PATENT DOCUMENTS

| | | |
|---|---|---|
| 2006/0200341 A1* | 9/2006 | Corston-Oliver ..... G06F 17/274 704/5 |
| 2006/0218134 A1 | 9/2006 | Simske et al. |
| 2009/0094177 A1 | 4/2009 | Aoki |
| 2011/0270834 A1 | 11/2011 | Sokolan et al. |
| 2012/0016657 A1* | 1/2012 | He ................. G06F 17/2836 704/2 |
| 2014/0122486 A1 | 5/2014 | Simard et al. |
| 2014/0156567 A1 | 6/2014 | Scholtes |
| 2014/0351258 A1 | 11/2014 | Dayan et al. |
| 2016/0162456 A1* | 6/2016 | Munro ................. G06F 17/241 704/9 |
| 2017/0024375 A1* | 1/2017 | Hakkani-Tur ...... G06F 17/2785 |

* cited by examiner

Fig. 5

EVALUATING TEXT CLASSIFIER PARAMETERS BASED ON SEMANTIC FEATURES

CROSS REFERENCE TO RELATED APPLICATIONS

The present application claims the benefit of priority under 35 USC 119 to Russian Patent Application No. 2016113866, filed Apr. 12, 2016; the disclosure of which is herein incorporated by reference in its entirety for all purposes.

TECHNICAL FIELD

The present disclosure is generally related to computer systems, and is more specifically related to systems and methods for natural language processing.

BACKGROUND

Various natural language processing tasks may involve classifying natural language texts. Examples of such tasks include detecting semantic similarities, search result ranking, determination of text authorship, spam filtering, selecting texts for contextual advertising, etc.

SUMMARY OF THE DISCLOSURE

In accordance with one or more aspects of the present disclosure, an example method may comprise: performing a semantico-syntactic analysis of a natural language text of a corpus of natural language texts to produce a semantic structure representing a set of semantic classes; identifying a natural language text feature to be extracted using a set of values of a plurality of feature extraction parameters; partitioning the corpus of natural language texts into a training data set comprising a first plurality of natural language texts and a validation data set comprising a second plurality of natural language texts; determining, in view of the category of the training data set, the set of values of the feature extraction parameters; validating the set of values of the feature extraction parameters using the validation data set.

In accordance with one or more aspects of the present disclosure, another example method may comprise: performing, by a processing device, a semantico-syntactic analysis of a natural language text of a corpus of natural language texts to produce a semantic structure representing a set of semantic classes; identifying a text classifier model associated with a set of values of a plurality of hyper-parameters; partitioning the corpus of natural language texts into a training data set comprising a first plurality of natural language texts and a validation data set comprising a second plurality of natural language texts; determining, in view of the training data set, the set of values of the hyper-parameters of the text classifier model; validating the set of values of the hyper-parameters using the validation data set.

In accordance with one or more aspects of the present disclosure, an example system may comprise: a memory; a processor, coupled to the memory, the processor configured to: perform a semantico-syntactic analysis of a natural language text of a corpus of natural language texts to produce a semantic structure representing a set of semantic classes; identify a natural language text feature to be extracted using a set of values of a plurality of feature extraction parameters; partition the corpus of natural language texts into a training data set comprising a first plurality of natural language texts and a validation data set comprising a second plurality of natural language texts; determine, in view of the category of the training data set, the set of values of the feature extraction parameters; validate the set of values of the feature extraction parameters using the validation data set.

In accordance with one or more aspects of the present disclosure, an example computer-readable non-transitory storage medium may comprise executable instructions that, when executed by a computer system, cause the computer system to perform a semantico-syntactic analysis of a natural language text of a corpus of natural language texts to produce a semantic structure representing a set of semantic classes; identify a text classifier model associated with a set of values of a plurality of hyper-parameters; partition the corpus of natural language texts into a training data set comprising a first plurality of natural language texts and a validation data set comprising a second plurality of natural language texts; determine, in view of the training data set, the set of values of the hyper-parameters of the text classifier model; validate the set of values of the hyper-parameters using the validation data set.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 5 schematically illustrates an example of a lexico-morphological structure of a sentence, in accordance with one or more aspects of the present disclosure;

DETAILED DESCRIPTION

Figure 1:
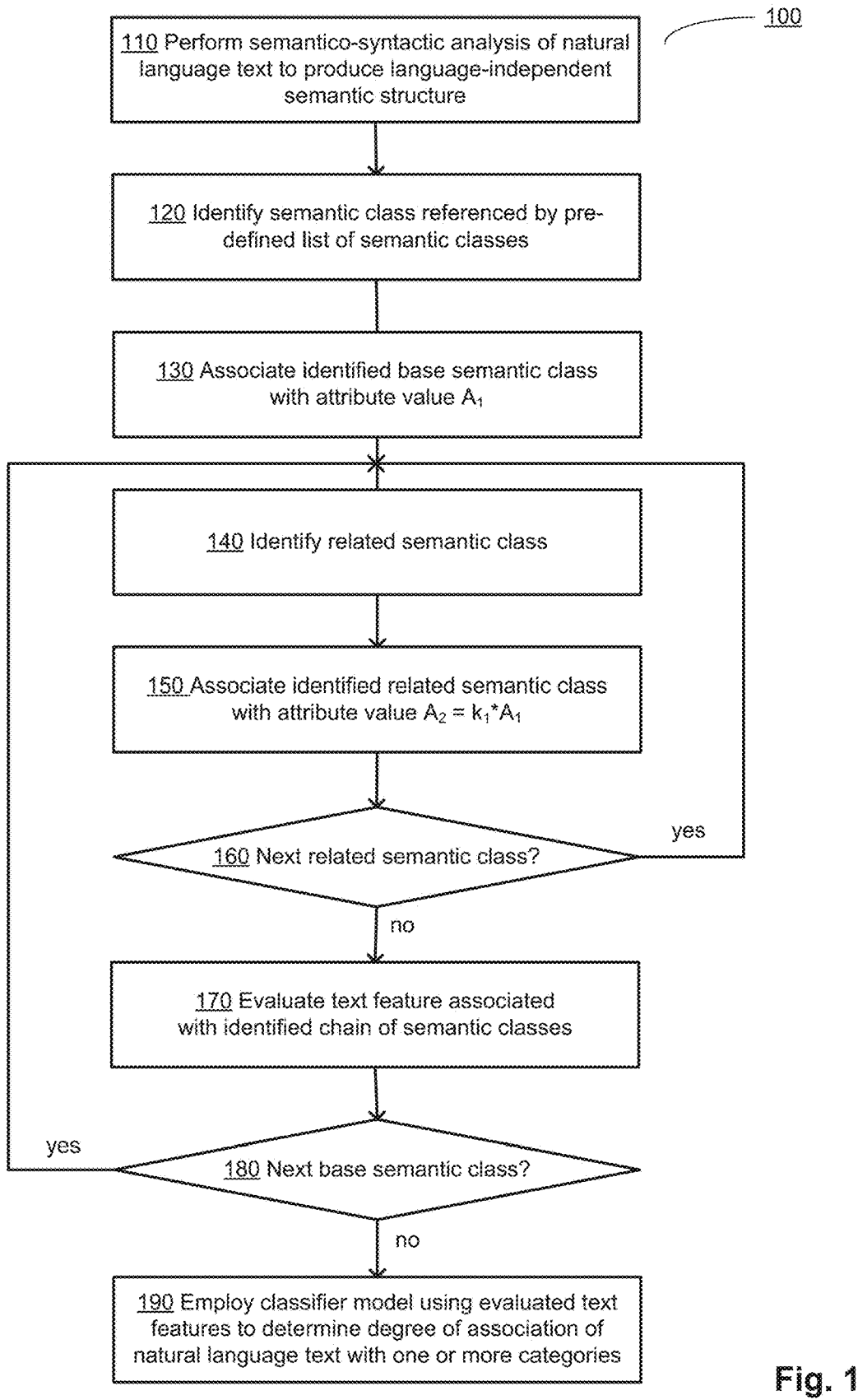
FIG. 1 depicts a flow diagram of an example method for natural language text classification based on semantic features, in accordance with one or more aspects of the present disclosure.

Described herein are methods and systems for evaluating text classifier parameters based on semantic features. "Computer system" herein shall refer to a data processing device having a general purpose processor, a memory, and at least one communication interface. Examples of computer systems that may implement the systems and methods described herein include, without limitation, desktop computers, notebook computers, tablet computers, and smart phones.

Natural language text classification may involve associating a given natural language text, which may be represented, e.g., by at least a portion of a document, with one or more categories of a certain set of categories. In certain implementations, the set of categories may be pre-determined (e.g., may be received via a graphical user interface (GUI) or an application programming interface (API)). Alternatively, the set of categories may identified on-the-fly at the time of performing the classification, by analyzing the text corpus that includes the texts to be classified (e.g., a plurality of items of a news feed).

The natural language texts may be classified based on one or more lexical, semantic or syntactic features. The procedure of evaluating the text features, also referred to as feature extraction, may involve preforming a semantico-syntactic analysis of a natural language text, to produce at least one language-independent semantic structure which may comprise a plurality of semantic classes, as described in more details herein below. Any reference to a "semantic structure" herein shall be construed as referencing one or more semantic structures.

For example, a text feature may be represented by the frequency of occurrence of instances of a certain semantic class within the language-independent semantic structures representing the text. The language independence of the semantic structure allows performing language-independent text classification (e.g., classifying texts represented in multiple natural languages).

The language-independent semantic classes constitute an integral part of linguistic semantic descriptions, as described in more details herein below. The semantic classes may be organized into a hierarchical structure which is also referred to as a "semantic hierarchy" herein. In certain implementations, the feature extraction may produce more accurate results by taking into account the semantic hierarchy to effectively consider chains of semantic classes representing multiple levels of abstraction of a certain semantic class. For example, if a text feature is represented by the frequency of occurrence of instances of a certain semantic class within the language-independent semantic structures representing the text, the occurrences of ancestors and/or descendants of the semantic class in a semantic hierarchy may be taken into account for evaluating the feature. The hierarchy of the semantic classes may be reflected by associating certain attribute values (which may be thought of as weight coefficients reflecting the relationship of the particular semantic class to a certain text feature) with each semantic class along a certain line of ancestry. In an illustrative example, the attribute values may be represented by a geometric sequence of real numbers which may increase or decrease along the line of ancestry.

Therefore, a semantic class may be associated with a vector of attribute values reflecting the relationship of the semantic class to the corresponding text features. A value of a certain attribute of an ancestor or a descendant of a particular base semantic class may be determined by applying a pre-defined transformation to the attribute value of the base semantic class. The transformation may involve multiplying the feature value of the base semantic class by a pre-defined multiplier. The transformation may be repeatedly applied to attribute values associated with two or more generations of ancestors and/or descendants of the base semantic class. In an illustrative example, the consecutive transformations may involve multiplying the feature value of the current semantic class by a pre-defined multiplier, where the multipliers applied to ancestors or descendants of a given base class form a geometric sequence of real numbers.

In an illustrative example, each natural language text may be represented by a point within a multi-dimensional space of the chosen text features, where the point coordinates are represented by the feature values. Therefore, performing the text classification may involve determining parameters of one or more separating hyperplanes that split the multi-dimensional space into sectors representing the classification categories.

The text classification may be performed by evaluating a classification function that reflects the degree of association of the text being classified with a certain category of the plurality of classification categories (e.g., the probability of the text being associated with a certain category). The text classification may involve evaluating the chosen classification function for each category of the plurality of classification categories, and associating the natural language text with the category corresponding to the optimal (maximum or minimum) value of the classification function.

In certain implementations, the above-described feature extraction procedure may be applied for analyzing a corpus of natural language texts and creating an evidence data set correlating the feature values and text categories. In an illustrative example, the evidence data set may be created and/or updated by processing a plurality of example natural language texts with known classification. For each example natural language text, chosen features may be evaluated, and the feature values may be stored in association with the identifier of the category to which the example natural language text pertains.

As noted herein above, a semantic class may be associated with a vector of attribute values reflecting the relationship of the semantic class to the corresponding text features. In certain implementations, values of various parameters of the feature extraction process (referred herein below as to "feature extraction parameters") may be determined by optimizing a certain objective function (e.g., a fitness function reflecting the number of natural language texts of the evidence data set that would be classified correctly using the specified values of the feature extraction parameters). Examples of feature extraction parameters include the number of levels of the semantic hierarchy being analyzed, the semantic classes instances of which are to be detected in the natural language text being analyzed, the value of a certain semantic class attribute to be associated with an instance of the semantic class responsive to detecting such an instance in the natural language text being analyzed, etc.

As noted herein above, the text classification may be performed by evaluating a classification function that reflects the degree of association of the text being classified with a certain category of the plurality of classification categories (e.g., the probability of the text being associated with a certain category). In certain implementations, the systems and methods described herein may further utilize the evidence data set for determining the values of one or more hyper-parameters of the chosen text classification model. "Hyper-parameter" herein shall refer to an adjustable value which is determined before applying the machine learning methods to fine-tune the classifier model parameters. Therefore, a hyper-parameter may be chosen a priori (e.g., by the classification model designer) or automatically or manually adjusted in accordance with one or more aspects of the present disclosure. In certain implementations, the values of various hyper-parameters of the text classifier model may be determined by optimizing a certain objective function (e.g., a fitness function reflecting the number of natural language texts of the evidence data set that would be classified correctly using the specified values of the hyper-parameters). Examples of feature extraction parameters include the regularization parameter of a classifier model that employs the support vector machine classifier, the number of nearest neighbors to be analyzed by a classifier model that employs the nearest neighbor classifier, etc.

In certain implementations, the evidence data set may be partitioned into a training data set and a validation data set using various cross-validation methods, as described in more details herein below. The training and validation data sets may then be utilized by an optimization method for determining the values of one or more feature extraction parameters and/or one or more hyper-parameters of the chosen text classifier model.

In an illustrative example, a differential evolution method may be employed for determining the values of one or more feature extraction parameters and/or one or more hyper-parameters of the chosen text classifier model. In an illustrative example, a differential evolution iteration may involve determining the values of the feature extraction parameters and/or hyper-parameters by optimizing the chosen objective function utilizing the training data set, followed by producing a next generation of text classifier models based on the current generation and chosen differential evolution parameters. Responsive to detecting, by validating new generation of text classifier models using the validation data set, a classifier model that outperforms a current generation model, the identified current generation model may be replaced by the outperforming model. The differential evolution iterations may be repeated until a terminating condition is not met, as described in more details herein below.

In certain implementations, one or more parameters of the chosen text classifier model may then be fine-tuned by a machine learning method (e.g., by optimizing a chosen objective function, which may be represented by a fitness function reflecting the number of natural language texts of the evidence data set that would be classified correctly using the specified values of the text classifier model parameters).

Various aspects of the above referenced methods and systems are described in details herein below by way of examples, rather than by way of limitation.

FIG. 1 depicts a flow diagram of an example method 100 for natural language text classification based on semantic features, in accordance with one or more aspects of the present disclosure. Method 100 and/or each of its individual functions, routines, subroutines, or operations may be performed by one or more processors of the computer system (e.g., computer system 1000 of FIG. 15) implementing the method. In certain implementations, method 100 may be performed by a single processing thread. Alternatively, method 100 may be performed by two or more processing threads, each thread implementing one or more individual functions, routines, subroutines, or operations of the method. In an illustrative example, the processing threads implementing method 100 may be synchronized (e.g., using semaphores, critical sections, and/or other thread synchronization mechanisms). Alternatively, the processing threads implementing method 100 may be executed asynchronously with respect to each other.

At block 110, the computer system implementing the method may perform a semantico-syntactic analysis of an input natural language text. The semantico-syntactic analysis may produce one or more language-independent semantic structures representing a set of semantic classes. Each semantic structure may be represented by a graph comprising a plurality of nodes corresponding to the semantic classes and a plurality of edges corresponding to a plurality of semantic relationships, as described in more details herein below with references to FIGS. 4-14. The language-independent semantic structures may be used as a source for extracting one or more lexical, semantic, or syntactic features of the natural language text. For example, a text feature may be represented by the frequency of occurrence, within the language-independent semantic structures representing the text, of instances of a specified semantic class and/or instances of other semantic classes that are associated with the specified semantic class by certain semantic relationships (such as ancestors or the specified semantic class, descendants of the specified semantic class or siblings of the specified semantic class).

At block 120, the computer system may identify, within the set of semantic classes comprised by the language-independent semantic structures representing the natural language text being analyzed, a certain semantic class (referred herein below as the base semantic class). In certain implementations, the semantic class may be referenced by a pre-determined list of semantic classes associated with certain features to be extracted from the text being analyzed.

At block 130, the computer system may associate the base semantic class with a value reflecting a specified attribute of the semantic class. In certain implementations, the specified attribute may represent a weight coefficient reflecting the relationship of the semantic class to a certain text feature. In an illustrative example, if the frequency of occurrence of a specified lexeme within the text being analyzed exceeds a certain threshold, the text may be associated with a pre-defined feature using a certain weight coefficient (e.g., if the frequency of occurrence of the word "agreement" within the text being analyzed exceeds 1%, the text may be associated with a feature "legal" by a weight coefficient of 0.5).

At block 140, the computer system may identify a semantic class associated with the specified semantic class by a pre-defined semantic relationship (such as an ancestor or the specified semantic class, a descendant of the specified semantic class or a sibling of the specified semantic class). The identified semantic class is referred herein below as a related semantic class with respect to the base semantic class.

At block 150, the computer system may associate the identified related semantic class with a value reflecting the specified attribute. The attribute value to be associated with the related semantic class may be determined by applying a pre-defined transformation to the attribute value of the base semantic class. The transformation may involve multiplying the feature value of the base semantic class by a pre-defined multiplier.

In an illustrative example, if the frequency of occurrence of a specified lexeme within the text being analyzed exceeds a first threshold, the text may be associated with a pre-defined feature using a first weight coefficient; if the frequency of occurrence of a hypernym of the specified lexeme within the text exceeds a second threshold, the text may be further associated with a pre-defined feature using a second weight coefficient, which may be a portion of the first weight coefficient. "Hypernym" herein refers to a superordinate semantic class, i.e., a semantic class whose specific instances form a set which includes the instances of a subordinate semantic class.

Responsive to ascertaining, at block 160, that another semantic class exists that is related to the base semantic class by the specified semantic relationship, the previously identified semantic class may be declared as the new base class, and the method may loop back to block 140, so that the operations described herein above with references to block 140-150 may be repeated for two or more semantic classes that are related to the base semantic class and/or to each other by the pre-defined semantic relationship. In an illustrative example, a chain including two or more of ancestors or descendants of the base semantic class may be identified. In another illustrative example, two or more first-generation descendants of the base semantic class, which are siblings to each other, may be identified.

If two or more related semantic classes of the base class are identified, the attribute values to be associated with the identified related semantic classes may be determined by sequentially applying a pre-defined transformation to the attribute value of the previous semantic class in the chain of semantic classes. As noted herein above, the consecutive transformations may involve multiplying the feature value of the current semantic class by a pre-defined multiplier, where the multipliers applied to ancestors or descendants of a given base class form a geometric sequence of real numbers.

At block 170, the computer system may evaluate a text feature associated with the identified chain of semantic classes, using the identified attribute values associated with each semantic class.

Responsive to ascertaining, at block 180, that another base semantic class is referenced by the list of semantic classes to be analyzed, the method may loop back to block 120; otherwise the processing may continue at block 190.

At block 190, the computer system may employ a classifier model using the evaluated features of the natural language text to determine a degree of association of the natural language text with one or more categories of a pre-defined set of categories.

As noted herein above, natural language text classification may involve associating a given natural language text, which may be represented, e.g., by at least a portion of a document, with one or more categories of a certain set of categories. In certain implementations, the set of categories may be pre-determined (e.g., may be received via a graphical user interface (GUI) or an application programming interface (API)). Alternatively, the set of categories may be identified on-the-fly at the time of performing the classification, by analyzing the text corpus that includes the texts to be classified.

The computer system may, for each category of a plurality of text classification categories, calculate a value of the text classifier model reflecting the probability of the text being associated with the respective category. The computer system may then select the optimal (e.g., maximal or minimal) value among the calculated values, and associate the document with a category corresponding to the selected optimal value of the text classifier model. Responsive to completing the classification operations referenced by block 190, the method may terminate.

While in an illustrative example described in more details herein below, the classification function may be provided by a naïve Bayes classifier, other probabilistic or deterministic functions may be employed by the methods described herein.

In an illustrative example, the classification function may be provided by a naïve Bayes classifier:

$$p(C_k | F_1, \ldots, F_n) = \frac{1}{Z} p(C_k) \prod_{i=1}^{n} p(F_i | C_k)$$

Where $p(c_k|F_1, \ldots, F_n)$ is the conditional probability of an object having the parameter values $F_1, \ldots, F_n$ being associated with the category $C_k$, $P(c_k)$ is the apriori probability of an object being associated with the category $C_k$, Z is the normalizing constant, and $P(F_i|C_k)$ is the probability of an object having the parameter value $F_i$ being associated with the category $C_k$.

In another illustrative example, the classification function may be provided by a support vector machine classifier. In yet another illustrative example, the classification function may be provided by the nearest neighbor classifier.

In certain implementations, the computer system implementing the systems and methods described herein may, for each category of a plurality of text classification categories, calculate a value of the chosen classification function reflecting the probability of the text being associated with the respective category. The computer system may then select the optimal (e.g., maximal or minimal) value among the calculated values, and associate the document with a category corresponding to the selected optimal value of the classification function.

As noted herein above, a semantic class may be associated with a vector of attribute values reflecting the relationship of the semantic class to the corresponding text features. In certain implementations, values of various feature extraction parameters and/or hyper-parameters of the chosen text classifier model may be determined by optimizing a certain objective function (e.g., a fitness function reflecting the number of natural language texts of the evidence data set that would be classified correctly using the specified values of the feature extraction parameters).

Figure 2:
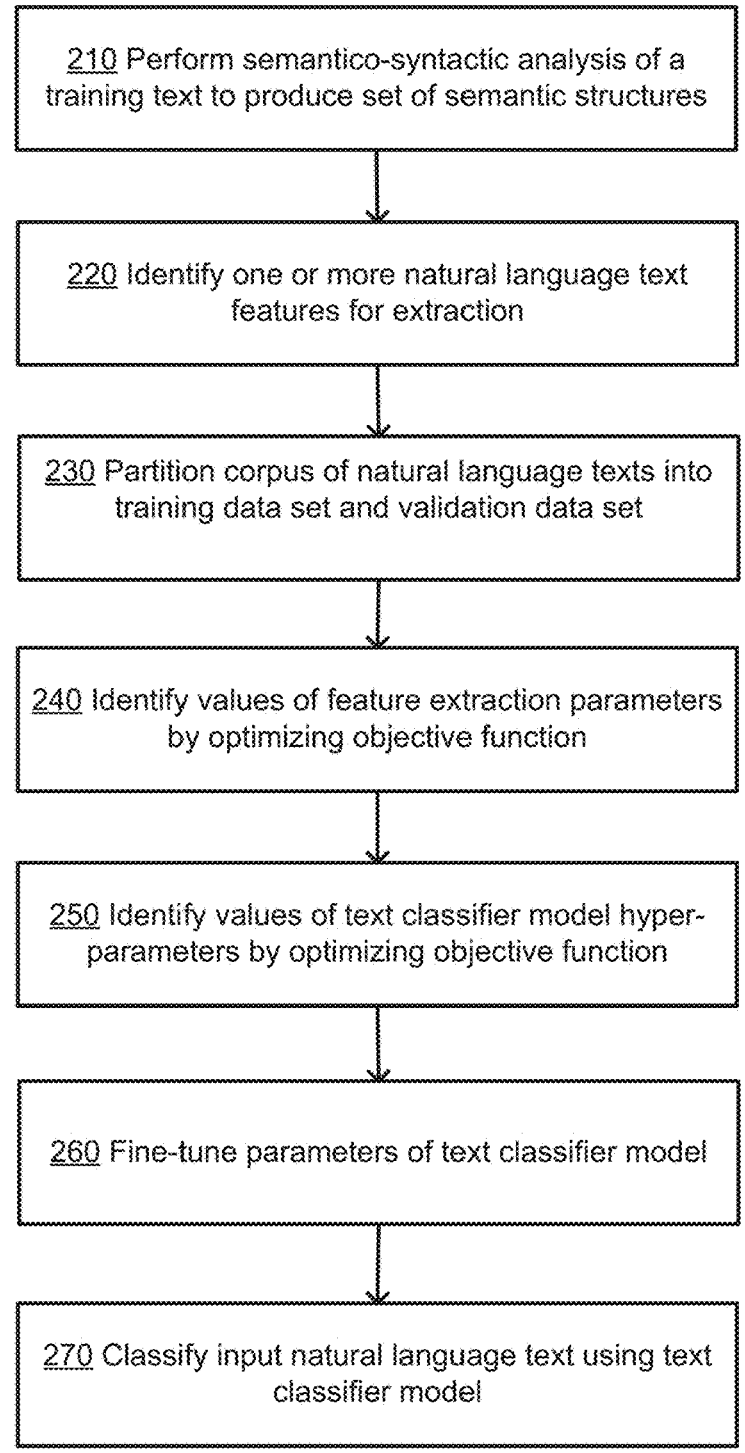
FIG. 2 depicts a flow diagram of an example method for determining values of the feature extraction parameters and/or hyper-parameters of a text classifier model, in accordance with one or more aspects of the present disclosure.

FIG. 2 depicts a flow diagram of an example method 200 for determining values of the feature extraction parameters and/or hyper-parameters of a text classifier model, in accordance with one or more aspects of the present disclosure. Method 200 and/or each of its individual functions, routines, subroutines, or operations may be performed by one or more processors of the computer system (e.g., computer system 1000 of FIG. 15) implementing the method. In certain implementations, method 200 may be performed by a single processing thread. Alternatively, method 200 may be performed by two or more processing threads, each thread implementing one or more individual functions, routines, subroutines, or operations of the method. In an illustrative example, the processing threads implementing method 200 may be synchronized (e.g., using semaphores, critical sections, and/or other thread synchronization mechanisms). Alternatively, the processing threads implementing method 200 may be executed asynchronously with respect to each other.

At block 210, the computer system implementing the method may perform a semantico-syntactic analysis of one or more natural language texts comprised by the evidence data set. The analysis may produce one or more language-independent semantic structures representing a set of semantic classes. Each semantic structure may be represented by a graph comprising nodes corresponding to semantic classes and a plurality of edges corresponding to semantic relationships, as described in more details herein below with references to FIGS. 4-14.

At block 220, the computer system may identify one or more features of the natural language text to be extracted from the semantic structures produced by the semantico-syntactic analysis, as described in more details herein above. For example, a text feature may be represented by the frequency of occurrence, within the language-independent semantic structures representing the text, of instances of a specified semantic class and/or instances of other semantic classes that are associated with the specified semantic class by certain semantic relationships (such as ancestors or the specified semantic class, descendants of the specified semantic class or siblings of the specified semantic class, as described in more details herein above with references to FIG. 1).

At block 230, the computer system may partition a corpus of natural language texts into a training data set comprising a first plurality of natural language texts and a validation data set comprising a second plurality of natural language texts. In certain implementations, partitioning the text corpus may comprise cross-validating the training data set and the validation data set. In order to reduce the result variability, multiple rounds of cross-validation may be performed using different partitions, and the model validation results may be aggregated (e.g., averaged) over the rounds.

In an illustrative example, a k-fold cross-validation method may be applied to the corpus of natural language texts. The method may involve randomly partitioning the original text corpus into k equal sized data sets, one of which is then utilized as the validation data set, and the remaining k−1 subsets are utilized as training data sets. The cross-validation process may then repeated k times, so that each of the k data sets would once be used as the validation data. The k results may then be aggregated to produce a single estimation.

At block 240, the computer system may iteratively identify the values of the specified feature extraction parameters of the text classifier model that would optimize a chosen objective function (e.g., maximize a fitness function reflecting the number of natural language texts of the validation data set that would be classified correctly using the specified values of the feature extraction parameters). In an illustrative example, the feature extraction parameters whose values need to be determined may be identified via a GUI or an API. Alternatively, a pre-defined set of feature extraction parameters may be chosen for evaluation.

At block 250, the computer system may iteratively identify the values of the specified hyper-parameters of the text classifier model that would optimize a chosen objective function (e.g., maximize a fitness function reflecting the number of natural language texts of the validation data set that would be classified correctly using the specified values of the text classifier hyper-parameters). In an illustrative example, the feature extraction parameters whose values need to be determined may be identified via a GUI or an API. Alternatively, a pre-defined set of feature extraction parameters may be chosen for evaluation.

Since the objective function employed for evaluating the feature extraction parameters and/or text classifier hyper-parameters is non-differentiable, the method chosen for optimizing the objective function should not require evaluating the gradient of the objective function. In certain implementations, the computer system may apply a differential evolution optimization method, an example of which is described in more details herein below with references to FIG. 3. The optimization method may involve iteratively identifying a set of values of the feature extraction parameters and/or text classifier hyper-parameters by processing a plurality of training natural language texts with known classification. For each training text, the computer system may evaluate the text features and store the determined feature values in association with the identifier of the category to which the example text pertains. The determined values of the feature extraction parameters and/or text classifier hyper-parameters may then be validated using the validation data set.

At block 260, the computer system may fine-tune one or more parameters of the chosen text classifier model by applying a machine learning method (e.g., by optimizing a chosen objective function, which may be represented by a fitness function reflecting the number of natural language texts of the evidence data set that would be classified correctly using the specified values of the text classifier model parameters).

At block 270, the computer system may classify an input natural language text by applying the text classifier model, as described in more details herein above. The computer system may, for each category of a plurality of text classification categories, calculate a value of the text classifier model parameters reflecting the probability of the text being associated with the respective category. The computer system may then select the optimal (e.g., maximal or minimal) value among the calculated values, and associate the document with a category corresponding to the selected optimal value of the text classifier model, as described in more details herein above. Responsive to completing the classification operations referenced by block 270, the method may terminate.

Figure 3:
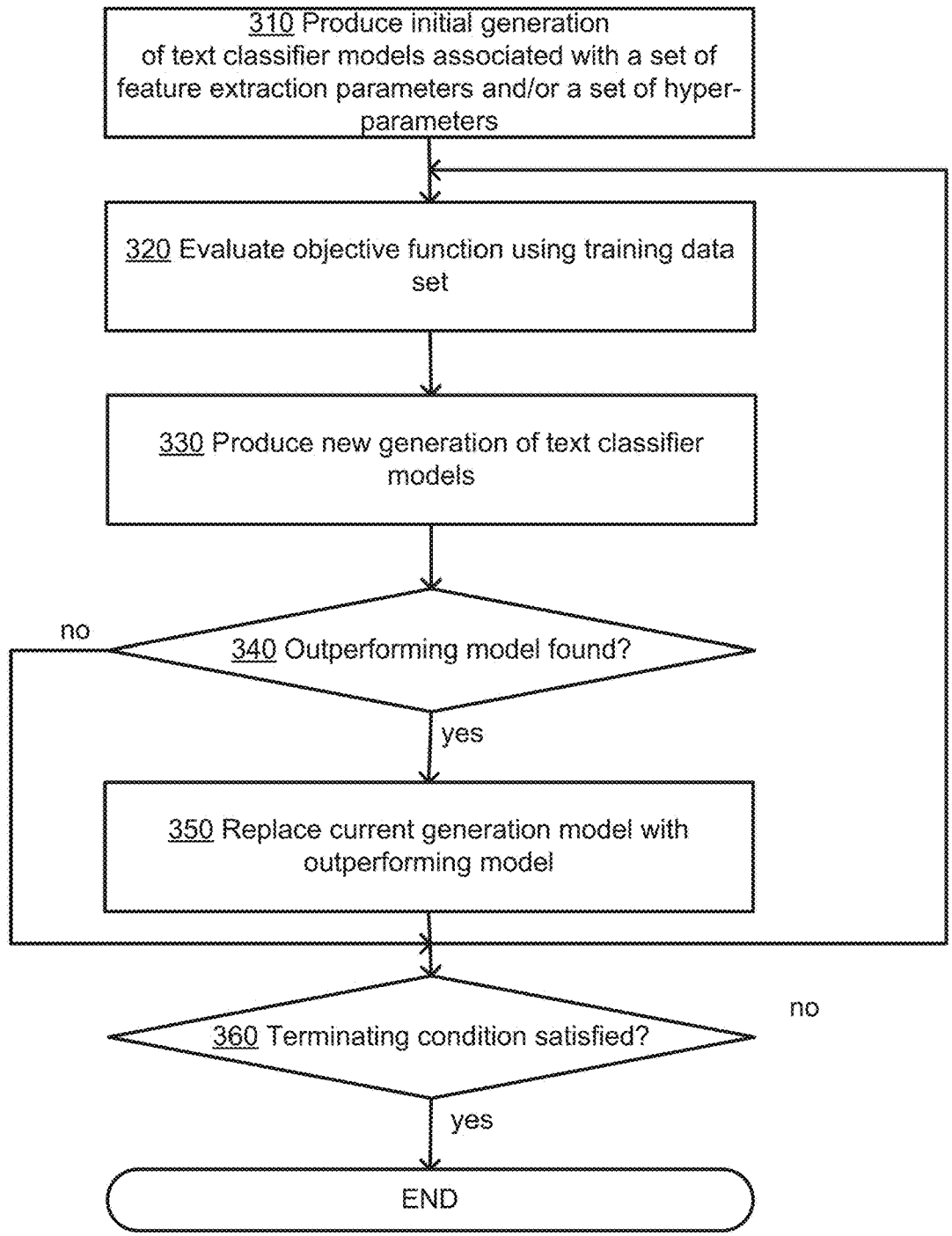
FIG. 3 depicts a flow diagram of an example differential evolution optimization method for optimizing a chosen objective function in order to determine values of the feature extraction parameters and/or hyper-parameters a text classifier model, in accordance with one or more aspects of the present disclosure.

FIG. 3 depicts a flow diagram of an example differential evolution optimization method 300 for optimizing a chosen objective function in order to determine values of the feature extraction parameters and/or hyper-parameters a text classifier model, in accordance with one or more aspects of the present disclosure. Method 300 and/or each of its individual functions, routines, subroutines, or operations may be performed by one or more processors of the computer system (e.g., computer system 1000 of FIG. 15) implementing the method. In certain implementations, method 300 may be performed by a single processing thread. Alternatively, method 300 may be performed by two or more processing threads, each thread implementing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other.

At block 310, the computer system implementing the method may produce an initial generation comprising one or more text classifier models associated with the respective sets of feature extraction parameters and/or hyper-parameters.

At block 320, the computer system may utilize one or more natural language texts of the training data set to evaluate an objective function, which in an illustrative example may be represented by fitness function reflecting the number of natural language texts of the training data set and/or training data set that would be classified correctly using the values of the feature extraction parameters and/or hyper-parameters of the current generation of text classifier models.

At block 330, the computer system may produce a new generation of classifier models associated with the respective sets of feature extraction parameters and/or hyper-parameters. Producing the new generation of text classifier of models may involve modifying, using a pre-defined linear transformation, the values of one or more feature extraction parameters and/or hyper-parameters that are selected by a randomization procedure.

Responsive to identifying, at block 340, a new generation model that outperforms a model of the current generation by producing a better value of the chosen objective function, the computer system may, at block 350, replace the identified current generation model with the outperforming model.

Responsive to ascertaining, at block 360, that a terminating condition is satisfied, the method may terminate; otherwise, the method may loop back to block 330. In an illustrative example, the terminating condition may be represented by a quality metric (e.g., a ratio of the number of natural language texts of the training data set and/or training data set that have been correctly classified and the total number of the natural language texts in the respective data sets) exceeding a certain threshold. In another illustrative example, the terminating condition may be represented by a number of iterations that have been performed.

Figure 4:
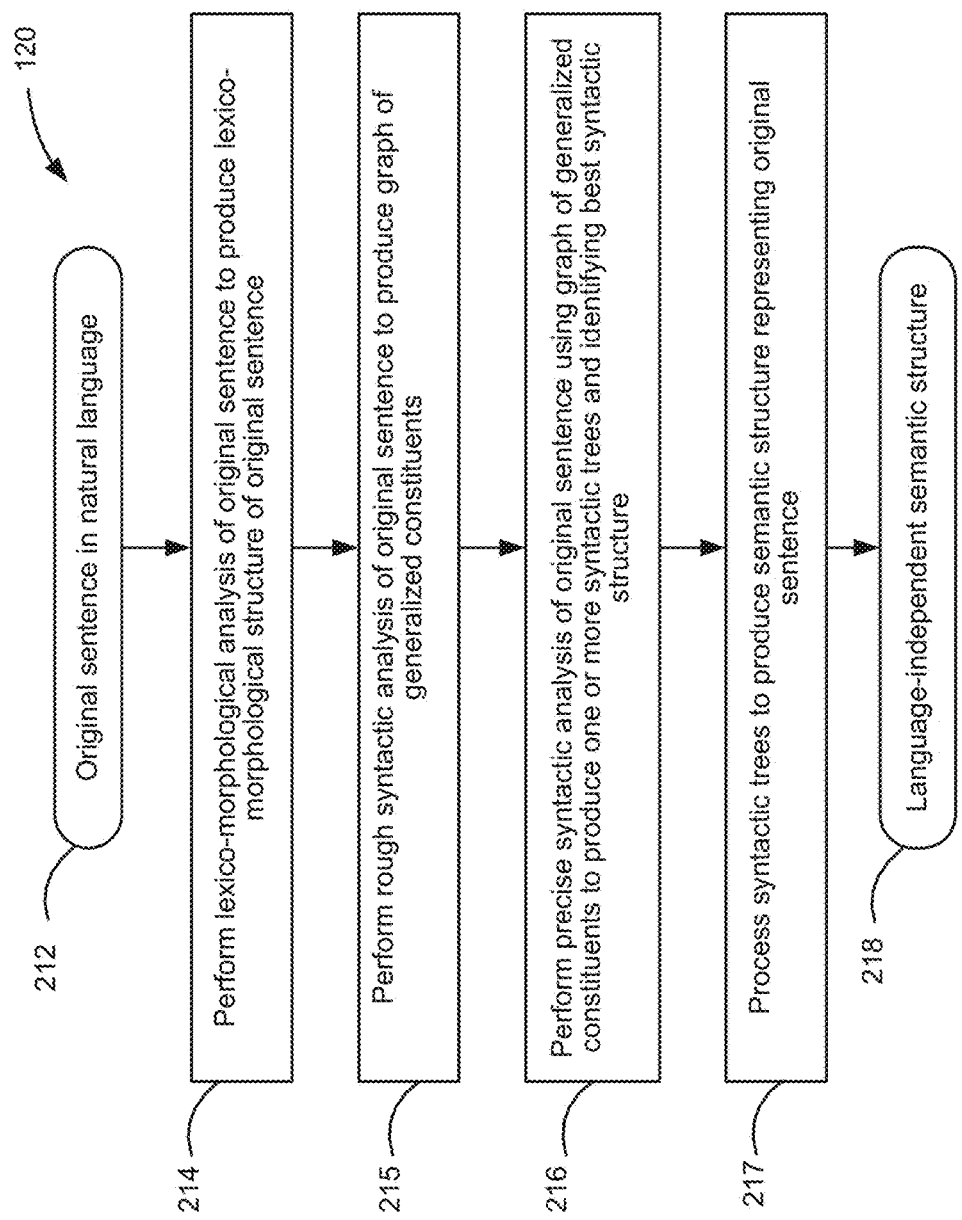
FIG. 4 depicts a flow diagram of an example method for performing a semantico-syntactic analysis of a natural language sentence 212, in accordance with one or more aspects of the present disclosure.

FIG. 4 depicts a flow diagram of an example method 400 for performing a semantico-syntactic analysis of a natural language sentence 212, in accordance with one or more aspects of the present disclosure. Method 400 may be applied to one or more syntactic units (e.g., sentences) comprised by a certain text corpus, in order to produce a plurality of semantico-syntactic trees corresponding to the syntactic units. In various illustrative examples, the natural language sentences to be processed by method 400 may be retrieved from one or more electronic documents which may be produced by scanning or otherwise acquiring images of paper documents and performing optical character recognition (OCR) to produce the texts associated with the documents. The natural language sentences may be also retrieved from various other sources including electronic mail messages, social networks, digital content files processed by speech recognition methods, etc.

At block 214, the computer system implementing the method may perform lexico-morphological analysis of sentence 212 to identify morphological meanings of the words comprised by the sentence. "Morphological meaning" of a word herein shall refer to one or more lemma (i.e., canonical or dictionary forms) corresponding to the word and a corresponding set of values of grammatical attributes defining the grammatical value of the word. Such grammatical attributes may include the lexical category of the word and one or more morphological attributes (e.g., grammatical case, gender, number, conjugation type, etc.). Due to homonymy and/or coinciding grammatical forms corresponding to different lexico-morphological meanings of a certain word, two or more morphological meanings may be identified for a given word. An illustrative example of performing lexico-morphological analysis of a sentence is described in more details herein below with references to FIG. 5.

At block 215, the computer system may perform a rough syntactic analysis of sentence 212. The rough syntactic analysis may include identification of one or more syntactic models which may be associated with sentence 212 followed by identification of the surface (i.e., syntactic) associations within sentence 212, in order to produce a graph of generalized constituents. "Constituent" herein shall refer to a contiguous group of words of the original sentence, which behaves as a single grammatical entity. A constituent comprises a core represented by one or more words, and may further comprise one or more child constituents at lower levels. A child constituent is a dependent constituent and may be associated with one or more parent constituents.

At block 216, the computer system may perform a precise syntactic analysis of sentence 212, to produce one or more syntactic trees of the sentence. The pluralism of possible syntactic trees corresponding to a given original sentence may stem from homonymy and/or coinciding grammatical forms corresponding to different lexico-morphological meanings of one or more words within the original sentence. Among the multiple syntactic trees, one or more best syntactic tree corresponding to sentence 212 may be selected, based on a certain rating function talking into account compatibility of lexical meanings of the original sentence words, surface relationships, deep relationships, etc.

At block 217, the computer system may process the syntactic trees to the produce a semantic structure 218 corresponding to sentence 212. Semantic structure 218 may comprise a plurality of nodes corresponding to semantic classes, and may further comprise a plurality of edges corresponding to semantic relationships, as described in more details herein below.

Figure 5:
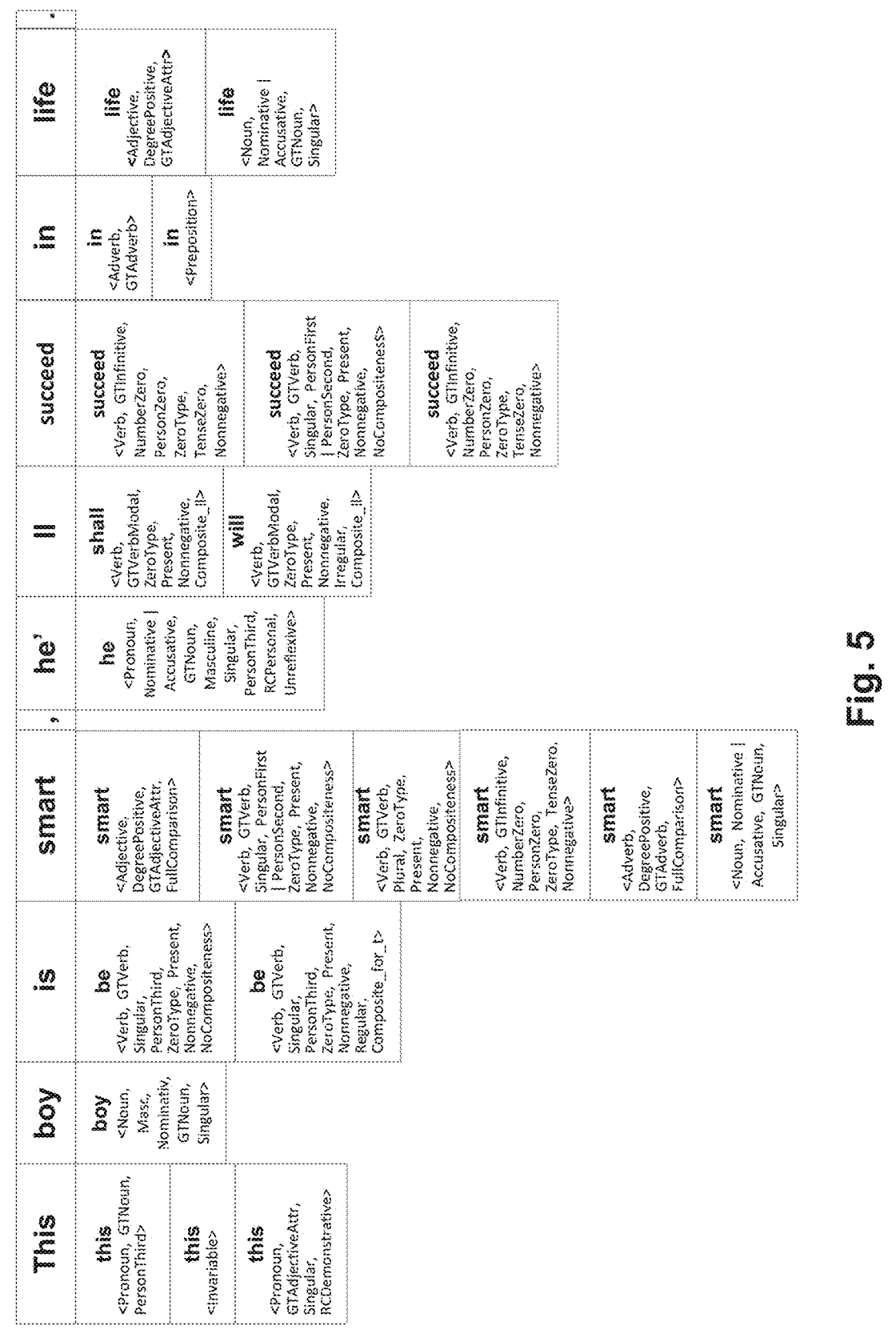

FIG. 5 schematically illustrates an example of a lexico-morphological structure of a sentence, in accordance with one or more aspects of the present disclosure. Example lexical-morphological structure 300 may comprise having a plurality of "lexical meaning-grammatical value" pairs for example sentence 320. In an illustrative example, "11" may be associated with lexical meaning "shall" 312 and "will" 314. The grammatical value associated with lexical meaning 312 is <Verb, GTVerbModal, ZeroType, Present, Nonnegative, Composite II>. The grammatical value associated with lexical meaning 314 is <Verb, GTVerbModal, ZeroType, Present, Nonnegative, Irregular, Composite II>.

Figure 6:
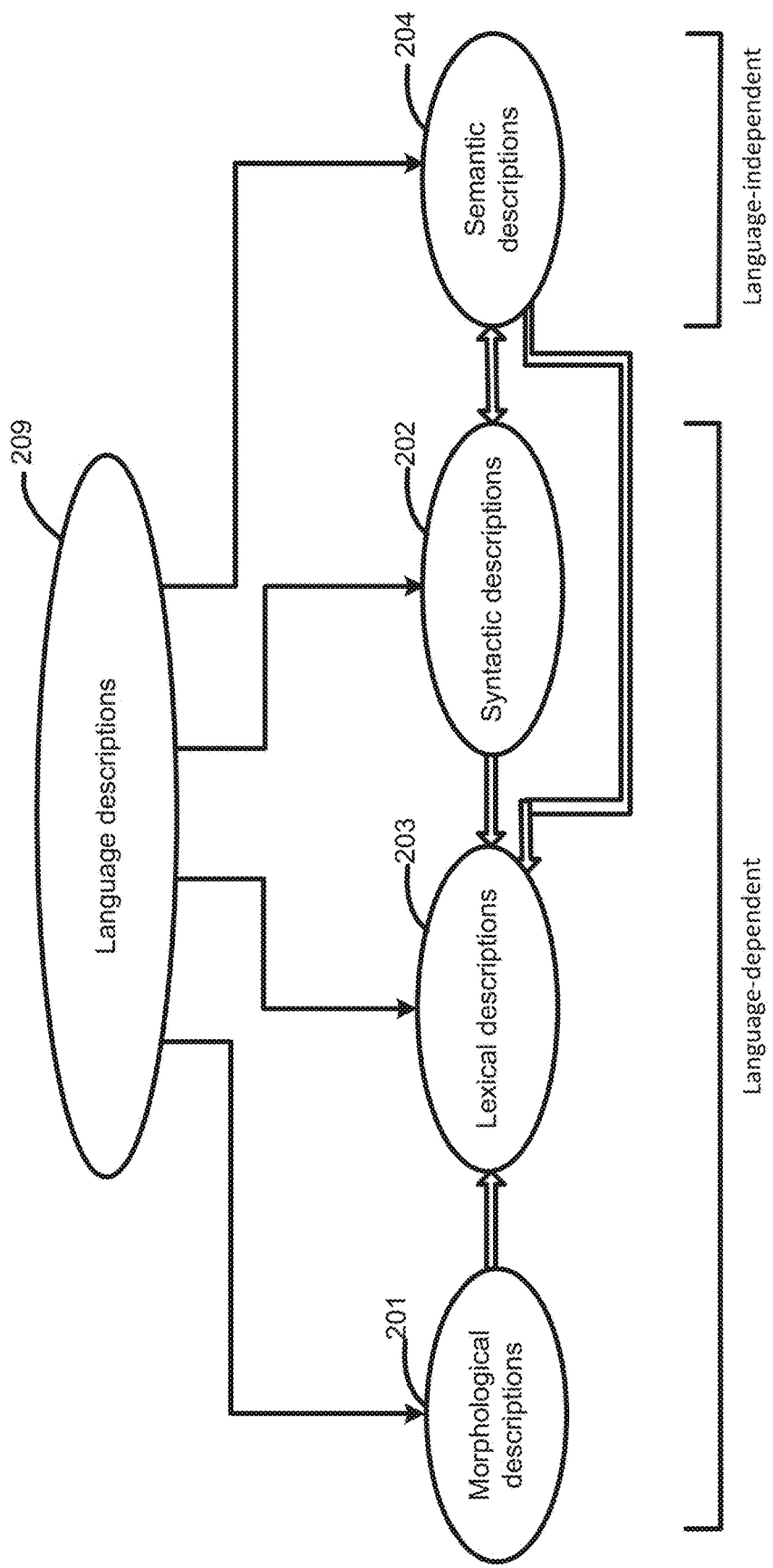
FIG. 6 schematically illustrates language descriptions representing a model of a natural language, in accordance with one or more aspects of the present disclosure.

FIG. 6 schematically illustrates language descriptions 209 including morphological descriptions 101, lexical descriptions 103, syntactic descriptions 102, and semantic descriptions 104, and their relationship thereof. Among them, morphological descriptions 101, lexical descriptions 103, and syntactic descriptions 102 are language-specific. A set of language descriptions 209 represent a model of a certain natural language.

In an illustrative example, a certain lexical meaning of lexical descriptions 203 may be associated with one or more surface models of syntactic descriptions 202 corresponding to this lexical meaning. A certain surface model of syntactic descriptions 202 may be associated with a deep model of semantic descriptions 204.

Figure 7:
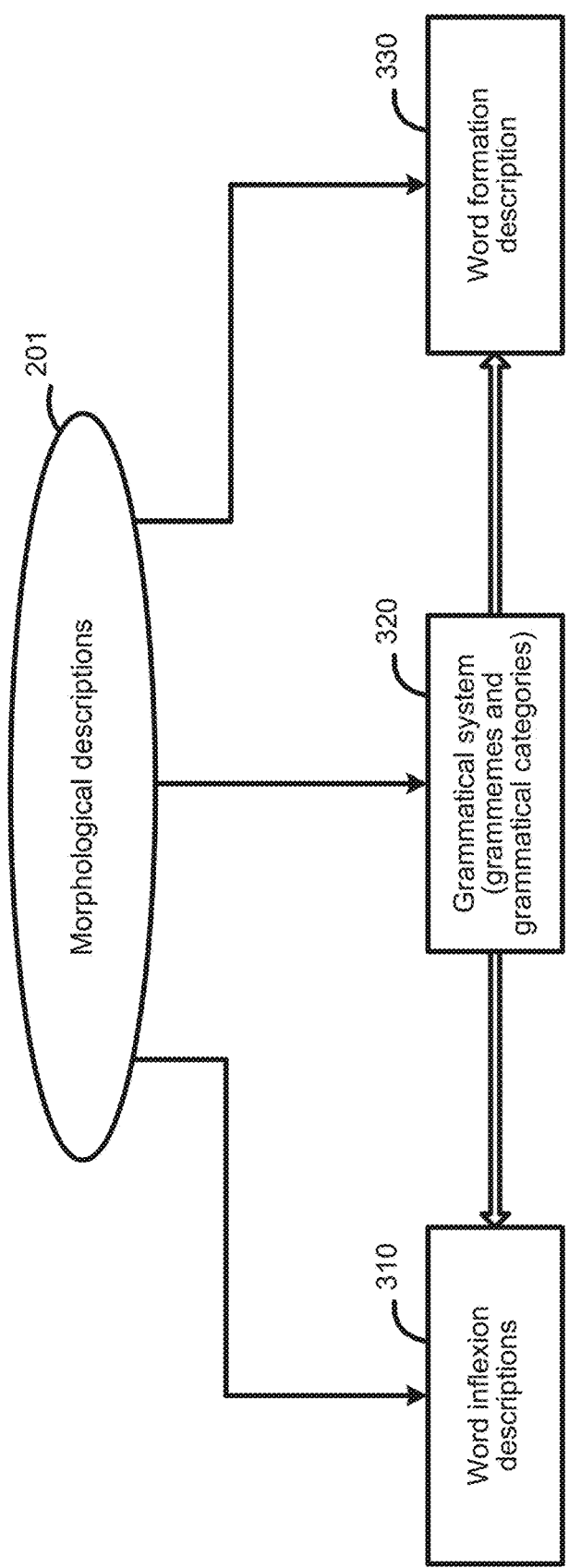
FIG. 7 schematically illustrates examples of morphological descriptions, in accordance with one or more aspects of the present disclosure.

FIG. 7 schematically illustrates several examples of morphological descriptions. Components of the morphological descriptions 201 may include: word inflexion descriptions 310, grammatical system 320, and word formation description 330, among others. Grammatical system 320 comprises a set of grammatical categories, such as, part of speech, grammatical case, grammatical gender, grammatical number, grammatical person, grammatical reflexivity, grammatical tense, grammatical aspect, and their values (also referred to as "grammemes"), including, for example, adjective, noun, or verb; nominative, accusative, or genitive case; feminine, masculine, or neutral gender; etc. The respective grammemes may be utilized to produce word inflexion description 310 and the word formation description 330.

Word inflexion descriptions 310 describe the forms of a given word depending upon its grammatical categories (e.g., grammatical case, grammatical gender, grammatical number, grammatical tense, etc.), and broadly includes or describes various possible forms of the word. Word formation description 330 describes which new words may be constructed based on a given word (e.g., compound words).

According to one aspect of the present disclosure, syntactic relationships among the elements of the original sentence may be established using a constituent model. A constituent may comprise a group of neighboring words in a sentence that behaves as a single entity. A constituent has a word at its core and may comprise child constituents at lower levels. A child constituent is a dependent constituent and may be associated with other constituents (such as parent constituents) for building the syntactic descriptions 202 of the original sentence.

Figure 8:
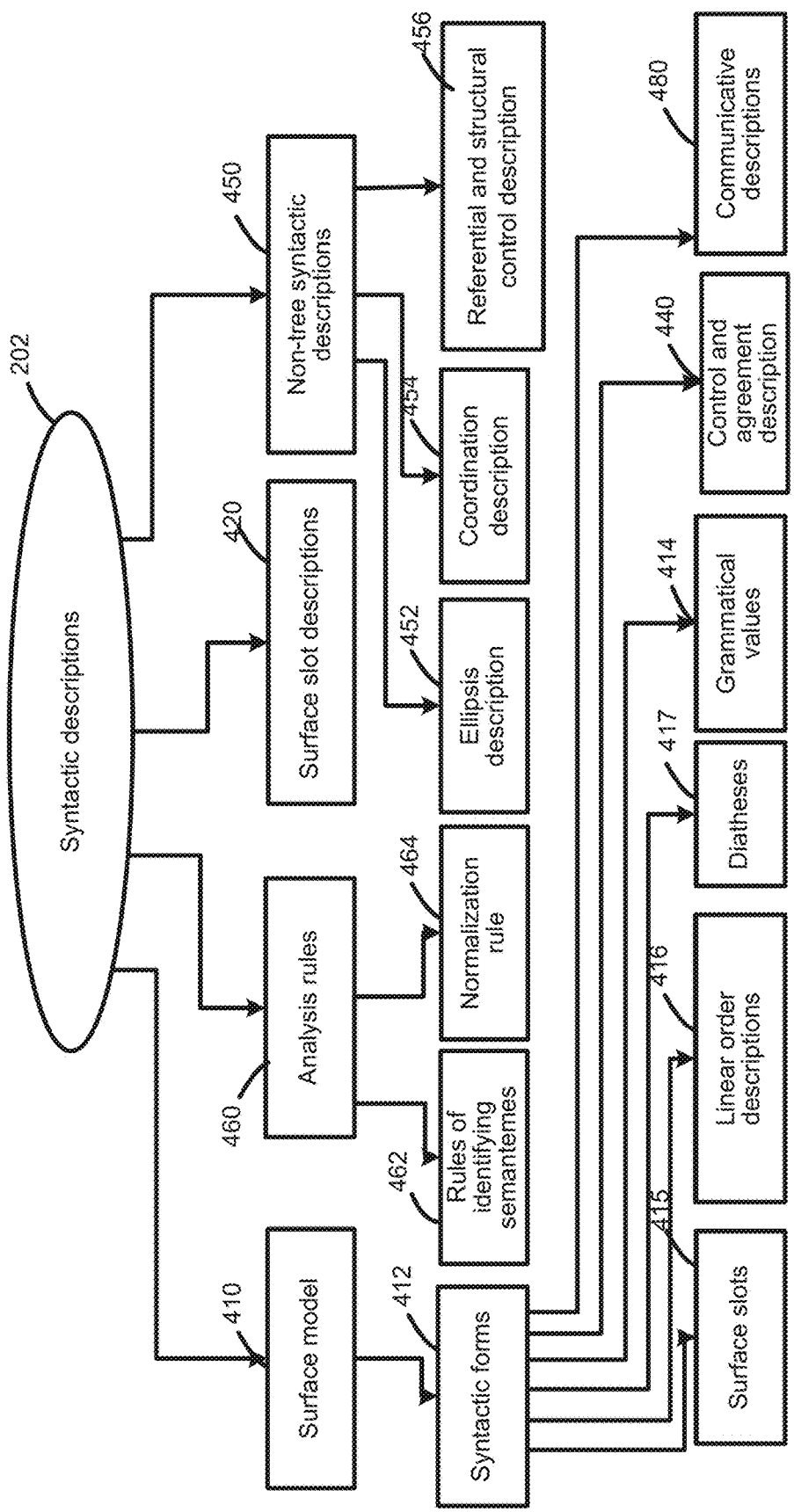
FIG. 8 schematically illustrates examples of syntactic descriptions, in accordance with one or more aspects of the present disclosure.

FIG. 8 illustrates exemplary syntactic descriptions. The components of the syntactic descriptions 202 may include, but are not limited to, surface models 410, surface slot descriptions 420, referential and structural control description 456, control and agreement description 440, non-tree syntactic description 450, and analysis rules 460. Syntactic descriptions 102 may be used to construct possible syntactic structures of the original sentence in a given natural language, taking into account free linear word order, non-tree syntactic phenomena (e.g., coordination, ellipsis, etc.), referential relationships, and other considerations.

Surface models 410 may be represented as aggregates of one or more syntactic forms ("syntforms" 412) employed to describe possible syntactic structures of the sentences that are comprised by syntactic description 102. In general, the lexical meaning of a natural language word may be linked to surface (syntactic) models 410. A surface model may represent constituents which are viable when the lexical meaning functions as the "core." A surface model may include a set of surface slots of the child elements, a description of the linear order, and/or diatheses. "Diathesis" herein shall refer to a certain relationship between an actor (subject) and one or more objects, having their syntactic roles defined by morphological and/or syntactic means. In an illustrative example, a diathesis may be represented by a voice of a verb: when the subject is the agent of the action, the verb is in the active voice, and when the subject is the target of the action, the verb is in the passive voice.

Figure 9:
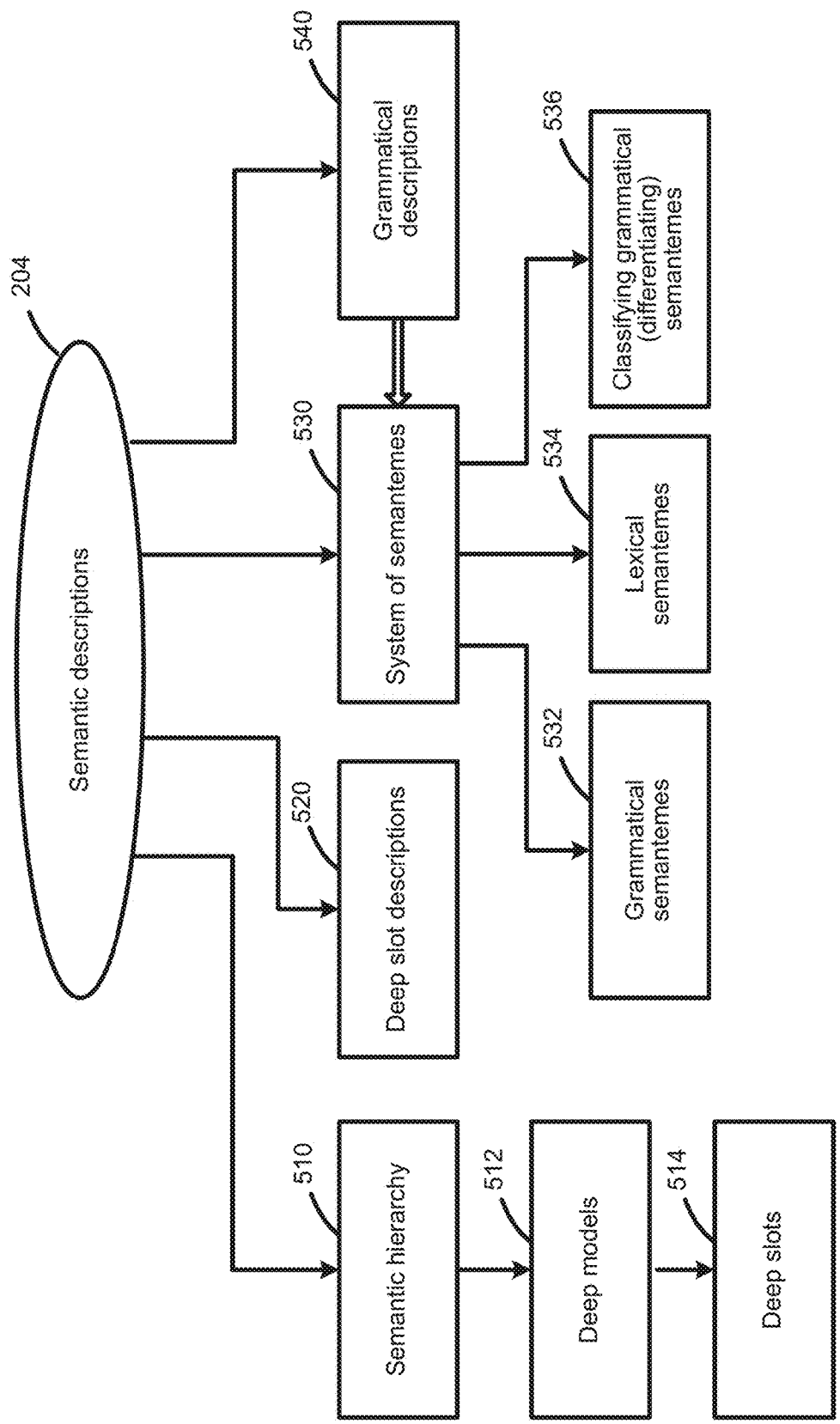
FIG. 9 schematically illustrates examples of semantic descriptions, in accordance with one or more aspects of the present disclosure.

A constituent model may utilize a plurality of surface slots 415 of the child constituents and their linear order descriptions 416 to describe grammatical values 414 of possible fillers of these surface slots. Diatheses 417 may represent relationships between surface slots 415 and deep slots 514 (as shown in FIG. 9). Communicative descriptions 480 describe communicative order in a sentence.

Linear order description 416 may be represented by linear order expressions reflecting the sequence in which various surface slots 415 may appear in the sentence. The linear order expressions may include names of variables, names of surface slots, parenthesis, grammemes, ratings, the "or" operator, etc. In an illustrative example, a linear order description of a simple sentence of "Boys play football" may be represented as "Subject Core Object_Direct," where Subject, Core, and Object_Direct are the names of surface slots 415 corresponding to the word order.

Communicative descriptions 480 may describe a word order in a syntform 412 from the point of view of communicative acts that are represented as communicative order expressions, which are similar to linear order expressions. The control and concord description 440 may comprise rules and restrictions which are associated with grammatical values of the related constituents and may be used in performing syntactic analysis.

Non-tree syntax descriptions 450 may be created to reflect various linguistic phenomena, such as ellipsis and coordination, and may be used in syntactic structures transformations which are generated at various stages of the analysis according to one or more aspects of the present disclosure. Non-tree syntax descriptions 450 may include ellipsis description 452, coordination description 454, as well as referential and structural control description 430, among others.

Analysis rules 460 may generally describe properties of a specific language and may be used in performing the semantic analysis. Analysis rules 460 may comprise rules of identifying semantemes 462 and normalization rules 464. Normalization rules 464 may be used for describing language-dependent transformations of semantic structures.

FIG. 9 illustrates exemplary semantic descriptions. Components of semantic descriptions 204 are language-independent and may include, but are not limited to, a semantic hierarchy 510, deep slots descriptions 520, a set of semantemes 530, and pragmatic descriptions 540.

The core of the semantic descriptions may be represented by semantic hierarchy 510 which may comprise semantic notions (semantic entities) which are also referred to as semantic classes. The latter may be arranged into hierarchical structure reflecting parent-child relationships. In general, a child semantic class may inherits one or more properties of its direct parent and other ancestor semantic classes. In an illustrative example, semantic class SUBSTANCE is a child of semantic class ENTITY and the parent of semantic classes GAS, LIQUID, METAL, WOOD_MATERIAL, etc.

Each semantic class in semantic hierarchy 510 may be associated with a corresponding deep model 512. Deep model 512 of a semantic class may comprise a plurality of deep slots 514 which may reflect semantic roles of child constituents in various sentences that include objects of the semantic class as the core of the parent constituent. Deep model 512 may further comprise possible semantic classes acting as fillers of the deep slots. Deep slots 514 may express semantic relationships, including, for example, "agent," "addressee," "instrument," "quantity," etc. A child semantic class may inherit and further expand the deep model of its direct parent semantic class.

Deep slots descriptions 520 reflect semantic roles of child constituents in deep models 512 and may be used to describe general properties of deep slots 514. Deep slots descriptions 520 may also comprise grammatical and semantic restrictions associated with the fillers of deep slots 514. Properties and restrictions associated with deep slots 514 and their possible fillers in various languages may be substantially similar and often identical. Thus, deep slots 514 are language-independent.

System of semantemes 530 may represents a plurality of semantic categories and semantemes which represent meanings of the semantic categories. In an illustrative example, a semantic category "DegreeOfComparison" may be used to describe the degree of comparison and may comprise the following semantemes: "Positive," "ComparativeHigherDegree," and "SuperlativeHighestDegree," among others. In another illustrative example, a semantic category "RelationToReferencePoint" may be used to describe an order (spatial or temporal in a broad sense of the words being analyzed), such as before or after a reference point, and may comprise the semantemes "Previous" and "Subsequent.". In yet another illustrative example, a semantic category "EvaluationObjective" can be used to describe an objective assessment, such as "Bad," "Good," etc.

System of semantemes 530 may include language-independent semantic features which may express not only semantic properties but also stylistic, pragmatic and communicative properties. Certain semantemes may be used to express an atomic meaning which corresponds to a regular grammatical and/or lexical expression in a natural language. By their intended purpose and usage, sets of semantemes may be categorized, e.g., as grammatical semantemes 532, lexical semantemes 534, and classifying grammatical (differentiating) semantemes 536.

Grammatical semantemes 532 may be used to describe grammatical properties of the constituents when transforming a syntactic tree into a semantic structure. Lexical semantemes 534 may describe specific properties of objects (e.g., "being flat" or "being liquid") and may be used in deep slot descriptions 520 as restriction associated with the deep slot fillers (e.g., for the verbs "face (with)" and "flood," respectively). Classifying grammatical (differentiating) semantemes 536 may express the differentiating properties of objects within a single semantic class. In an illustrative example, in the semantic class of HAIRDRESSER, the semanteme of <<RelatedToMen>> is associated with the lexical meaning of "barber," to differentiate from other lexical meanings which also belong to this class, such as "hairdresser," "hairstylist," etc. Using these language-independent semantic properties that may be expressed by elements of semantic description, including semantic classes, deep slots, and semantemes, may be employed for extracting the semantic information, in accordance with one or more aspects of the present invention.

Pragmatic descriptions 540 allow associating a certain theme, style or genre to texts and objects of semantic hierarchy 510 (e.g., "Economic Policy," "Foreign Policy," "Justice," "Legislation," "Trade," "Finance," etc.). Pragmatic properties may also be expressed by semantemes. In an illustrative example, the pragmatic context may be taken into consideration during the semantic analysis phase.

Figure 10:
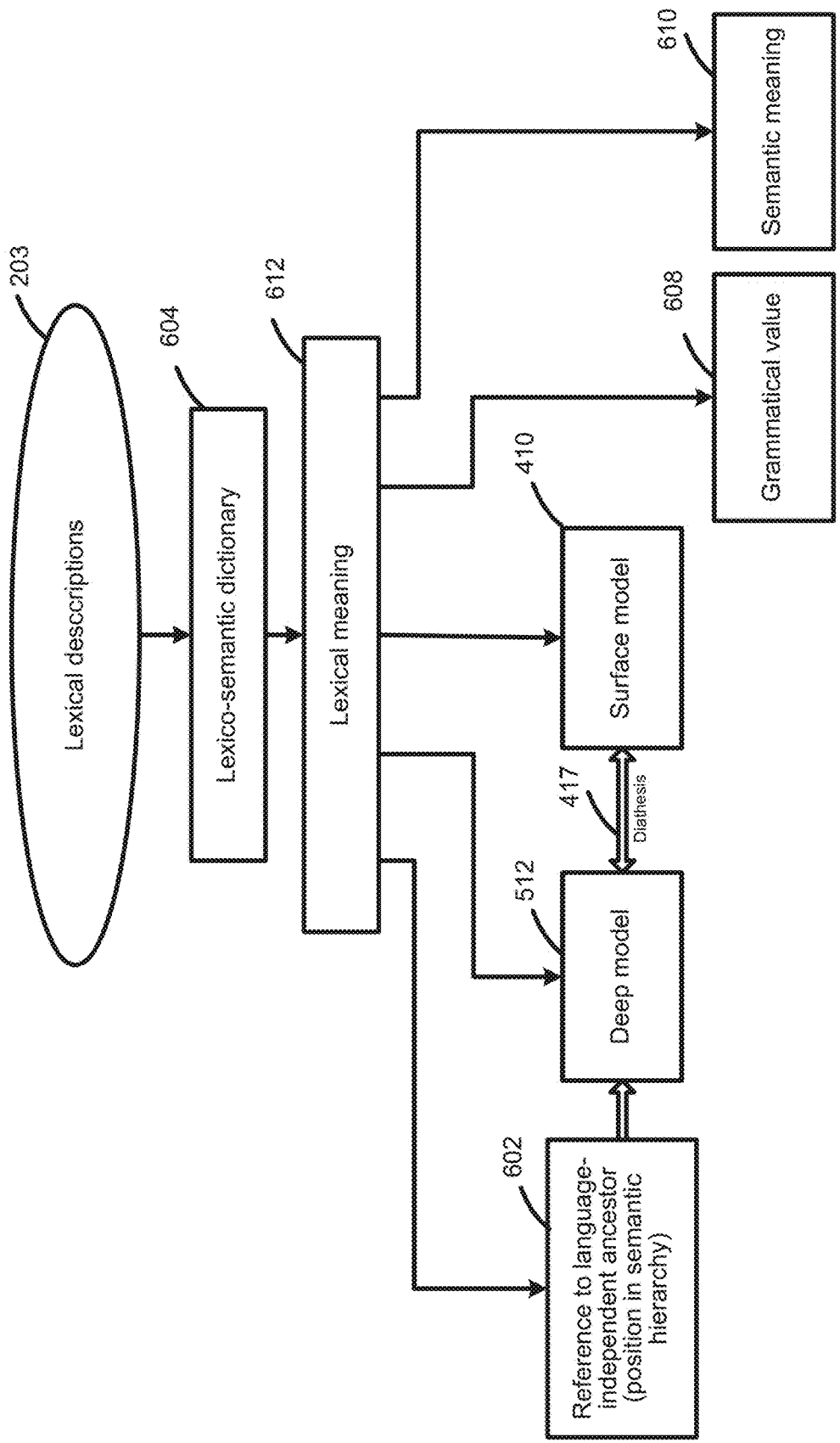
FIG. 10 schematically illustrates examples of lexical descriptions, in accordance with one or more aspects of the present disclosure.

FIG. 10 illustrates exemplary lexical descriptions. Lexical descriptions 203 represent a plurality of lexical meanings 612, in a certain natural language, for each component of a sentence. For a lexical meaning 612, a relationship 602 to its language-independent semantic parent may be established to indicate the location of a given lexical meaning in semantic hierarchy 510.

A lexical meaning 612 of lexical-semantic hierarchy 510 may be associated with a surface model 410 which, in turn, may be associated, by one or more diatheses 417, with a corresponding deep model 512. A lexical meaning 612 may inherit the semantic class of its parent, and may further specify its deep model 152.

A surface model 410 of a lexical meaning may comprise includes one or more syntforms 412. A syntform, 412 of a surface model 410 may comprise one or more surface slots 415, including their respective linear order descriptions 416, one or more grammatical values 414 expressed as a set of grammatical categories (grammemes), one or more semantic restrictions associated with surface slot fillers, and one or more of the diatheses 417. Semantic restrictions associated with a certain surface slot filler may be represented by one or more semantic classes, whose objects can fill the surface slot.

Figure 11:
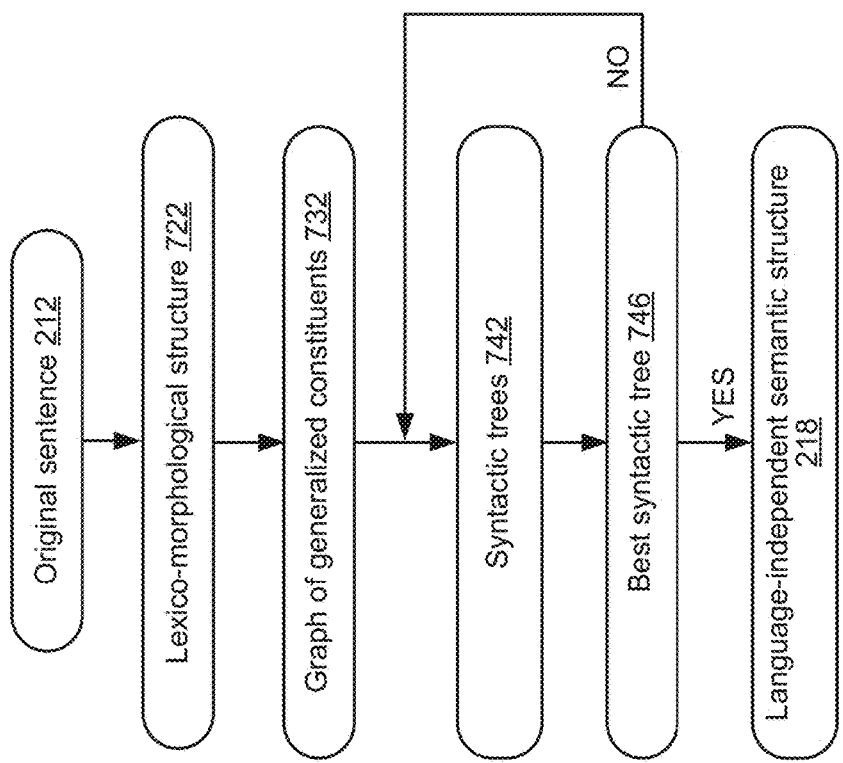
FIG. 11 schematically illustrates example data structures that may be employed by one or more methods implemented in accordance with one or more aspects of the present disclosure.

FIG. 11 schematically illustrates example data structures that may be employed by one or more methods described herein. Referring again to FIG. 4, at block 214, the computer system implementing the method may perform lexico-morphological analysis of sentence 212 to produce a lexico-morphological structure 722 of FIG. 11. Lexico-morphological structure 722 may comprise a plurality of mapping of a lexical meaning to a grammatical value for each lexical unit (e.g., word) of the original sentence. FIG. 5 schematically illustrates an example of a lexico-morphological structure.

At block 215, the computer system may perform a rough syntactic analysis of original sentence 212, in order to produce a graph of generalized constituents 732 of FIG. 11. Rough syntactic analysis involves applying one or more possible syntactic models of possible lexical meanings to each element of a plurality of elements of the lexico-morphological structure 722, in order to identify a plurality of potential syntactic relationships within original sentence 212, which are represented by graph of generalized constituents 732.

Graph of generalized constituents 732 may be represented by an acyclic graph comprising a plurality of nodes corresponding to the generalized constituents of original sentence 212, and further comprising a plurality of edges corresponding to the surface (syntactic) slots, which may express various types of relationship among the generalized lexical meanings. The method may apply a plurality of potentially viable syntactic models for each element of a plurality of elements of the lexico-morphological structure of original sentence 212 in order to produce a set of core constituents of original sentence 212. Then, the method may consider a plurality of viable syntactic models and syntactic structures of original sentence 212 in order to produce graph of generalized constituents 732 based on a set of constituents. Graph of generalized constituents 732 at the level of the surface model may reflect a plurality of viable relationships among the words of original sentence 212. As the number of viable syntactic structures may be relatively large, graph of generalized constituents 732 may generally comprise redundant information, including relatively large numbers of lexical meaning for certain nodes and/or surface slots for certain edges of the graph.

Graph of generalized constituents 732 may be initially built as a tree, starting with the terminal nodes (leaves) and moving towards the root, by adding child components to fill surface slots 415 of a plurality of parent constituents in order to reflect all lexical units of original sentence 212.

Figure 12:
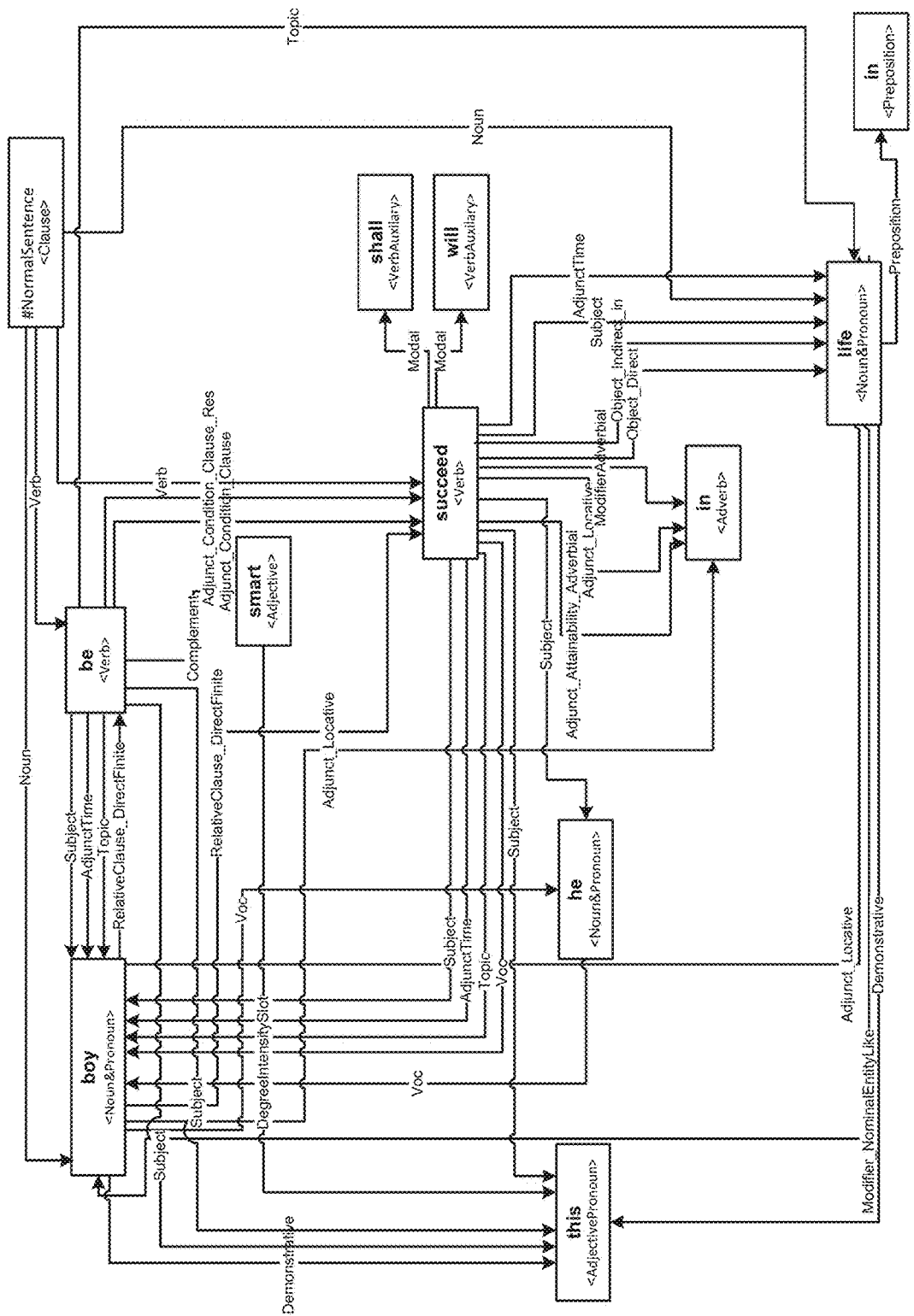
FIG. 12 schematically illustrates an example graph of generalized constituents, in accordance with one or more aspects of the present disclosure.

In certain implementations, the root of graph of generalized constituents 732 represents a predicate. In the course of the above described process, the tree may become a graph, as certain constituents of a lower level may be included into one or more constituents of an upper level. A plurality of constituents that represent certain elements of the lexico-morphological structure may then be generalized to produce generalized constituents. The constituents may be generalized based on their lexical meanings or grammatical values 414, e.g., based on part of speech designations and their relationships. FIG. 12 schematically illustrates an example graph of generalized constituents.

At block 216, the computer system may perform a precise syntactic analysis of sentence 212, to produce one or more syntactic trees 742 of FIG. 11 based on graph of generalized constituents 732. For each of one or more syntactic trees, the computer system may determine a general rating based on certain calculations and a priori estimates. The tree having the optimal rating may be selected for producing the best syntactic structure 746 of original sentence 212.

In the course of producing the syntactic structure 746 based on the selected syntactic tree, the computer system may establish one or more non-tree links (e.g., by producing redundant path among at least two nodes of the graph). If that process fails, the computer system may select a syntactic tree having a suboptimal rating closest to the optimal rating, and may attempt to establish one or more non-tree relationships within that tree. Finally, the precise syntactic analysis produces a syntactic structure 746 which represents the best syntactic structure corresponding to original sentence 212. In fact, selecting the best syntactic structure 746 also produces the best lexical values of original sentence 212.

At block 217, the computer system may process the syntactic trees to the produce a semantic structure 218 corresponding to sentence 212. Semantic structure 218 may reflect, in language-independent terms, the semantics conveyed by original sentence. Semantic structure 218 may be represented by an acyclic graph (e.g., a tree complemented by at least one non-tree link, such as an edge producing a redundant path among at least two nodes of the graph). The original natural language words are represented by the nodes corresponding to language-independent semantic classes of semantic hierarchy 510. The edges of the graph represent deep (semantic) relationships between the nodes. Semantic structure 218 may be produced based on analysis rules 460, and may involve associating, one or more attributes (reflecting lexical, syntactic, and/or semantic properties of the words of original sentence 212) with each semantic class.

Figure 13:
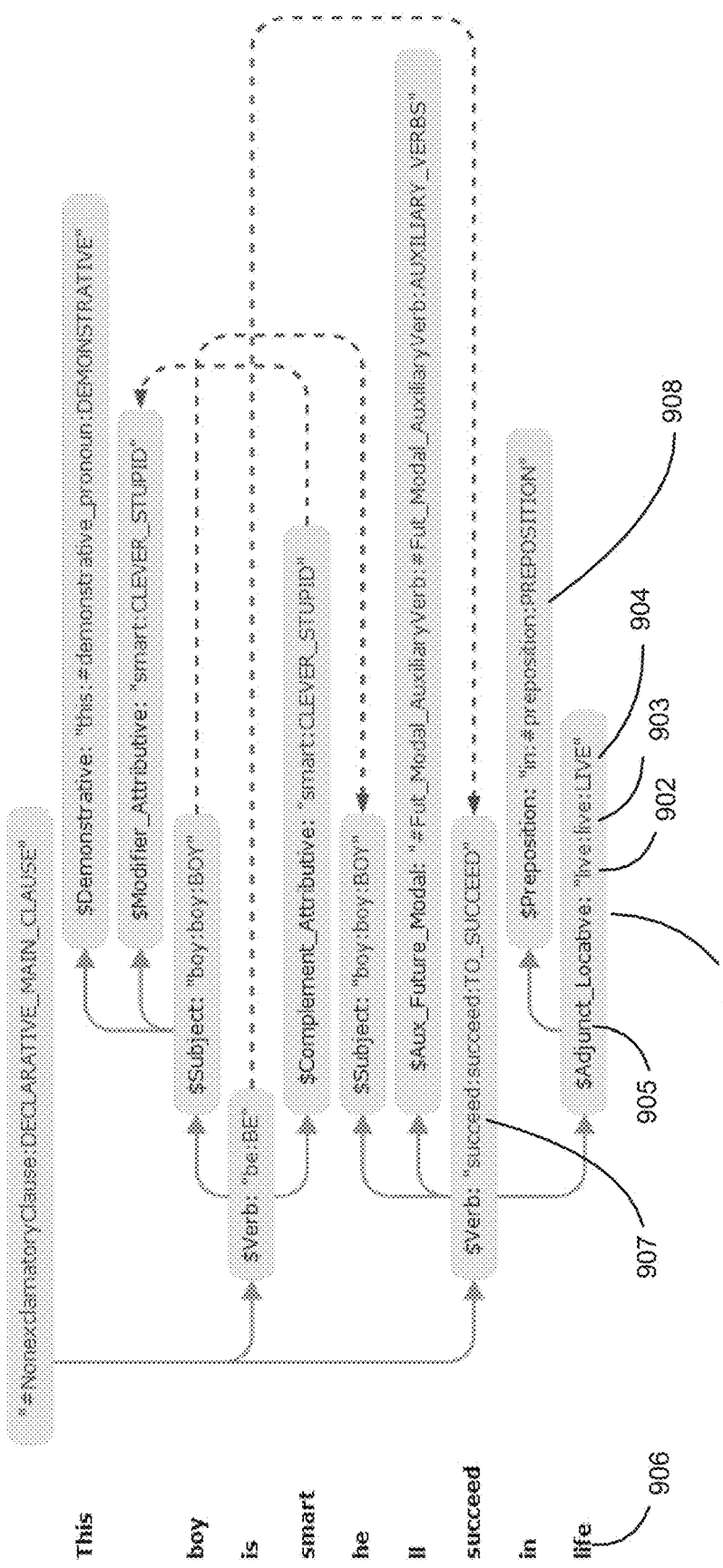
FIG. 13 illustrates an example syntactic structure corresponding to the sentence illustrated by FIG. 12.

FIG. 13 illustrates an example syntactic structure of a sentence derived from the graph of generalized constituents illustrated by FIG. 12. Node 901 corresponds to the lexical element "life" 906 in original sentence 212. By applying the method of semantico-syntactic analysis described herein, the computer system may establish that lexical element "life" 906 represents one of the lexemes of a derivative form "live" 902 associated with a semantic class "LIVE" 904, and fills in a surface slot $Adjunctr_Locative (905) of the parent constituent, which is represented by a controlling node $Verb:succeed:succeed:TO_SUCCEED (907).

Figure 14:
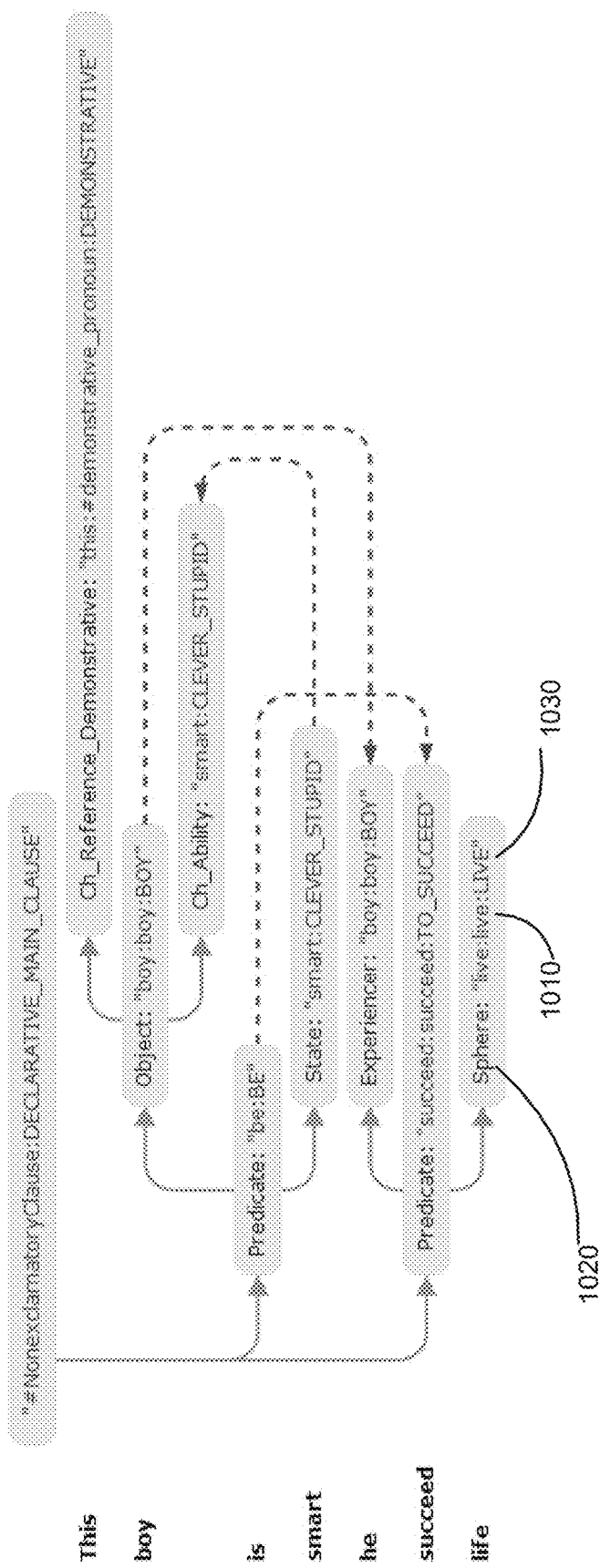
FIG. 14 illustrates a semantic structure corresponding to the syntactic structure of FIG. 13.

FIG. 14 illustrates a semantic structure corresponding to the syntactic structure of FIG. 13. With respect to the above referenced lexical element "life" 906 of FIG. 13, the semantic structure comprises lexical class 1010 and semantic classes 1030 similar to those of FIG. 13, but instead of surface slot 905, the semantic structure comprises a deep slot "Sphere" 1020.

In accordance with one or more aspects of the present disclosure, the computer system implementing the methods described herein may index one or more parameters yielded by the semantico-syntactic analysis. Thus, the methods described herein allow considering not only the plurality of words comprised by the original text corpus, but also pluralities of lexical meanings of those words, by storing and indexing all syntactic and semantic information produced in the course of semantico-syntactic analysis of each sentence of the original text corpus. Such information may further comprise the data produced in the course of intermediate stages of the analysis, the results of lexical selection, including the results produced in the course of resolving the ambiguities caused by homonymy and/or coinciding grammatical forms corresponding to different lexico-morphological meanings of certain words of the original language.

One or more indexes may be produced for each semantic structure. An index may be represented by a memory data structure, such as a table, comprising a plurality of entries. Each entry may represent a mapping of a certain semantic structure element (e.g., one or more words, a syntactic relationship, a morphological, lexical, syntactic or semantic property, or a syntactic or semantic structure) to one or more identifiers (or addresses) of occurrences of the semantic structure element within the original text.

In certain implementations, an index may comprise one or more values of morphological, syntactic, lexical, and/or semantic parameters. These values may be produced in the course of the two-stage semantic analysis, as described in more details herein. The index may be employed in various natural language processing tasks, including the task of performing semantic search.

The computer system implementing the method may extract a wide spectrum of lexical, grammatical, syntactic, pragmatic, and/or semantic characteristics in the course of performing the semantico-syntactic analysis and producing semantic structures. In an illustrative example, the system may extract and store certain lexical information, associations of certain lexical units with semantic classes, information regarding grammatical forms and linear order, information regarding syntactic relationships and surface slots, information regarding the usage of certain forms, aspects, tonality (e.g., positive and negative), deep slots, non-tree links, semantemes, etc.

The computer system implementing the methods described herein may produce, by performing one or more text analysis methods described herein, and index any one or more parameters of the language descriptions, including lexical meanings, semantic classes, grammemes, semantemes, etc. Semantic class indexing may be employed in various natural language processing tasks, including semantic search, classification, clustering, text filtering, etc. Indexing lexical meanings (rather than indexing words) allows searching not only words and forms of words, but also lexical meanings, i.e., words having certain lexical meanings. The computer system implementing the methods described herein may also store and index the semantico-syntactic structures produced by one or more text analysis methods described herein, for employing those structures and/or indexes in semantic search, classification, clustering, and document filtering.

Figure 15:
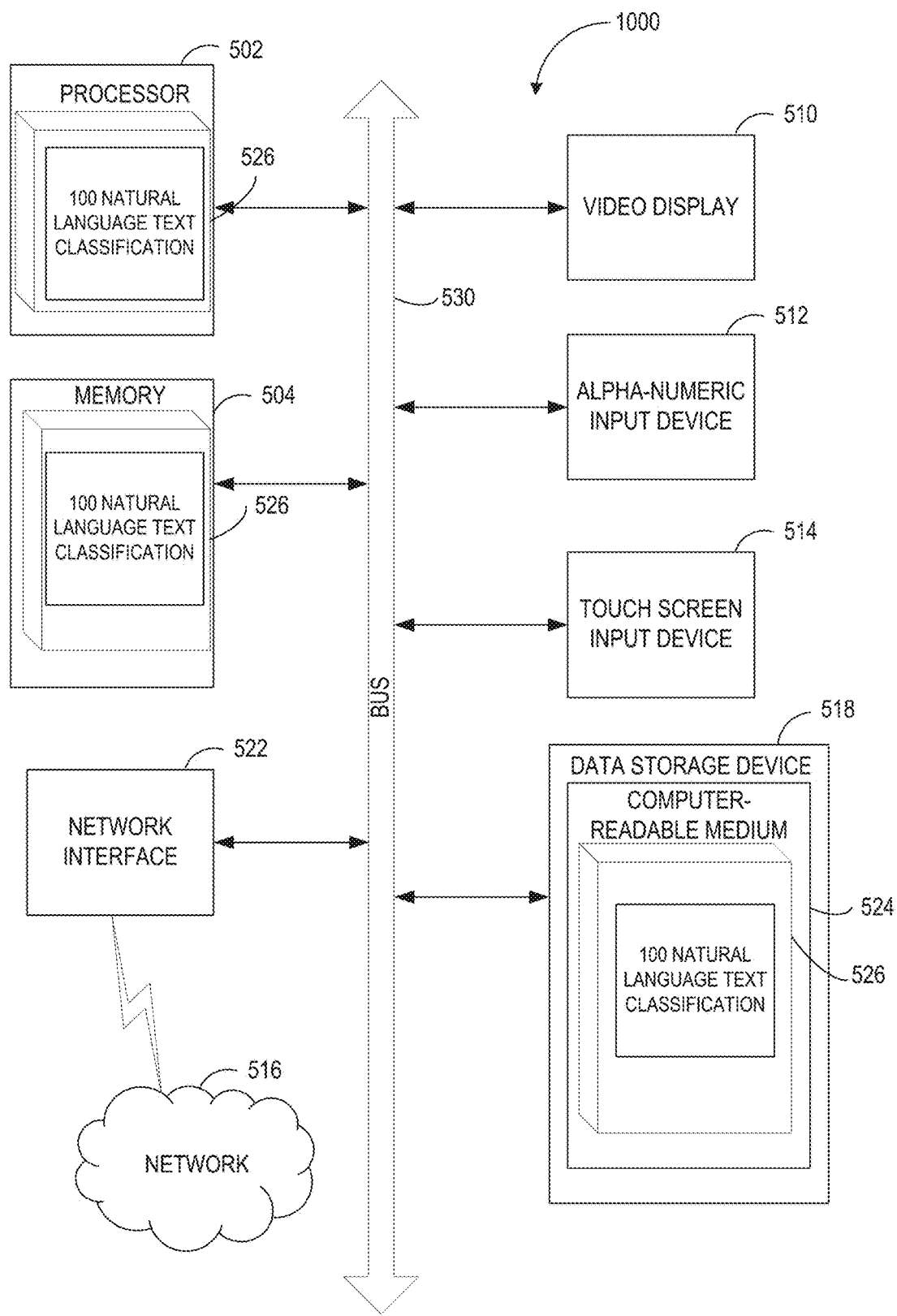
FIG. 15 depicts a diagram of an example computer system implementing the methods described herein.

FIG. 15 illustrates a diagram of an example computer system 1000 which may execute a set of instructions for causing the computer system to perform any one or more of the methods discussed herein. The computer system may be connected to other computer system in a LAN, an intranet, an extranet, or the Internet. The computer system may operate in the capacity of a server or a client computer system in client-server network environment, or as a peer computer system in a peer-to-peer (or distributed) network environment. The computer system may be a provided by a personal computer (PC), a tablet PC, a set-top box (STB), a Personal Digital Assistant (PDA), a cellular telephone, or any computer system capable of executing a set of instructions (sequential or otherwise) that specify operations to be performed by that computer system. Further, while only a single computer system is illustrated, the term "computer system" shall also be taken to include any collection of computer systems that individually or jointly execute a set (or multiple sets) of instructions to perform any one or more of the methodologies discussed herein.

Exemplary computer system 1000 includes a processor 502, a main memory 504 (e.g., read-only memory (ROM) or dynamic random access memory (DRAM)), and a data storage device 518, which communicate with each other via a bus 530.

Processor 502 may be represented by one or more general-purpose computer systems such as a microprocessor, central processing unit, or the like. More particularly, processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 502 may also be one or more special-purpose computer systems such as an application specific integrated circuit (ASIC), a field programmable gate array (FPGA), a digital signal processor (DSP), network processor, or the like. Processor 502 is configured to execute instructions 526 for performing the operations and functions discussed herein.

Computer system 1000 may further include a network interface device 522, a video display unit 510, a character input device 512 (e.g., a keyboard), and a touch screen input device 514.

Data storage device 518 may include a computer-readable storage medium 524 on which is stored one or more sets of instructions 526 embodying any one or more of the methodologies or functions described herein. Instructions 526 may also reside, completely or at least partially, within main memory 504 and/or within processor 502 during execution thereof by computer system 1000, main memory 504 and processor 502 also constituting computer-readable storage media. Instructions 526 may further be transmitted or received over network 516 via network interface device 522.

In certain implementations, instructions 526 may include instructions of method 100 for natural language text classification based on semantic features and/or method 200 for evaluating parameters of text classifier models. While computer-readable storage medium 524 is shown in the example of FIG. 15 to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The methods, components, and attributes described herein may be implemented by discrete hardware components or may be integrated in the functionality of other hardware components such as ASICS, FPGAs, DSPs or similar devices. In addition, the methods, components, and attributes may be implemented by firmware modules or functional circuitry within hardware devices. Further, the methods, components, and attributes may be implemented in any combination of hardware devices and software components, or only in software.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining," "computing," "calculating," "obtaining," "identifying," "modifying" or the like, refer to the actions and processes of a computer system, or similar electronic computer system, that manipulates and transforms data represented as physical (e.g., electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Various other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:
 identifying a plurality of feature extraction parameters of a text classifier model, wherein the plurality of feature extraction parameters comprises a first attribute of a first semantic class and a second attribute of a second semantic class, wherein a value of the second attribute is produced by applying a pre-defined transformation to a value of the first attribute;

partitioning a corpus of natural language texts into a training data set comprising a first plurality of natural language texts and a validation data set comprising a second plurality of natural language texts;

determining, in view of the training data set, a set of values of the feature extraction parameters, which maximizes a number of natural language texts of the validation data set that are classified correctly by the text classifier model using the set of values of the feature extraction parameters;

performing, by a processing device, a semantico-syntactic analysis of an input natural language text to produce a semantic structure representing a set of semantic classes;

producing a plurality of values by applying, to the semantic structure representing the input natural language text, the text classifier model using the set of values of the feature extraction parameters, wherein each value of the plurality of values reflects a degree of association of the input natural language text with a particular category of natural language texts;

associating the input natural language text with a category corresponding to an optimal value among the plurality of values; and utilizing the category to perform a natural language processing task.

2. The method of claim 1, wherein partitioning the corpus of natural language texts comprises cross-validating the first plurality of natural language texts and the second plurality of natural language texts.

3. The method of claim 1, further comprising:
validating the set of values of the feature extraction parameters to produce a quasi-optimal set of values relative to a third plurality of natural language texts.

4. The method of claim 1, wherein the plurality of feature extraction parameters comprises a number of levels of the semantic structure to be analyzed by the text classifier model.

5. The method of claim 1, wherein applying the pre-defined transformation comprises multiplying the value of the first attribute by a pre-defined multiplier.

6. A method, comprising:
identifying a plurality of hyper-parameters of a text classifier model, wherein the plurality of hyper-parameters include a number of nearest neighbors to be analyzed by the text classifier model;

partitioning a corpus of natural language texts into a training data set comprising a first plurality of natural language texts and a validation data set comprising a second plurality of natural language texts;

determining, in view of the training data set, a set of values of the hyper-parameters of the text classifier model, which maximizes a number of natural language texts of the validation data set that are classified correctly by the text classifier model using the set of values of the hyper-parameters;

performing, by a processing device, a semantico-syntactic analysis of an input natural language text to produce a semantic structure representing a set of semantic classes;

producing a plurality of values by applying, to the semantic structure representing the input natural language text, the text classifier model using the set of values of the hyper-parameters, wherein each value of the plurality of values reflects a degree of association of the input natural language text with a particular category of natural language texts;

associating the input natural language text with a category corresponding to an optimal value among the plurality of values; and utilizing the category to perform a natural language processing task.

7. The method of claim 6, wherein partitioning the corpus of natural language texts comprises cross-validating the first plurality of natural language texts and the second plurality of natural language texts.

8. The method of claim 6, further comprising:
validating the set of values of the feature extraction parameters to produce a quasi-optimal set of values relative to a third plurality of natural language texts.

9. The method of claim 6, wherein the plurality of hyper-parameters further comprises a regularization parameter of the text classifier model.

10. The method of claim 6, wherein determining the set of values of the hyper-parameters of the text classifier model further comprises:
modifying, using a pre-defined transformation, values of one or more hyper-parameters of the text classifier model to produce a modified set of values of the hyper-parameters;

evaluating the number of natural language texts of the validation data set that are classified correctly by the text classifier model using the modified set of values of the hyper-parameters;

responsive to determining that the number of natural language texts falls below a threshold number, repeating the modifying operation.

11. A system, comprising:
a memory;
a processor, coupled to the memory, the processor configured to:
identify a plurality of feature extraction parameters of a text classifier model, wherein the plurality of feature extraction parameters comprises a first attribute of a first semantic class and a second attribute of a second semantic class, wherein a value of the second attribute is produced by applying a pre-defined transformation to a value of the first attribute;

partition a corpus of natural language texts into a training data set comprising a first plurality of natural language texts and a validation data set comprising a second plurality of natural language texts;

determine, in view of the training data set, a set of values of the feature extraction parameters, which maximizes a number of natural language texts of the validation data set that are classified correctly by the text classifier model using the set of values of the feature extraction parameters;

perform a semantico-syntactic analysis of an input natural language text to produce a semantic structure representing a set of semantic classes;

produce a plurality of values by applying, to the semantic structure representing the input natural language text, the text classifier model using the set of values of the feature extraction parameters, wherein each value of the plurality of values reflects a degree of association of the input natural language text with a particular category of natural language text;

associate the input natural language text with a category corresponding to an optimal value among the plurality of values; and utilize the category to perform a natural language processing task.

12. The system of claim 11, wherein partitioning the corpus of natural language texts comprises cross-validating the first plurality of natural language texts and the second plurality of natural language texts.

13. The system of claim 11, wherein the plurality of feature extraction parameters comprises a number of levels of the semantic structure to be analyzed by the text classifier model.

14. A computer-readable non-transitory storage medium comprising executable instructions that, when executed by a computer system, cause the computer system to:

identify a plurality of hyper-parameters of a text classifier model, wherein the plurality of hyper-parameters include a number of nearest neighbors to be analyzed by the text classifier model;

partition a corpus of natural language texts into a training data set comprising a first plurality of natural language texts and a validation data set comprising a second plurality of natural language texts;

determine, in view of the training data set, a set of values of the hyper-parameters of the text classifier model, which maximizes a number of natural language texts of the validation data set that are classified correctly by the text classifier model using the set of values of the hyper-parameters;

perform a semantico-syntactic analysis of an input natural language text to produce a semantic structure representing a set of semantic classes; and produce a plurality of values by applying, to the semantic structure representing the input natural language text, the text classifier model using the set of values of the hyper-parameters, wherein each value of the plurality of values reflects a degree of association of the input natural language text with a particular category of natural language texts;

associate the input natural language text with a category corresponding to an optimal value among the plurality of values; and utilize the category to perform a natural language processing task.

15. The computer-readable non-transitory storage medium of claim 14, wherein partitioning the corpus of natural language texts comprises cross-validating the first plurality of natural language texts and the second plurality of natural language texts.

16. The computer-readable non-transitory storage medium of claim 14, wherein a hyper-parameter of the plurality of hyper-parameters represents a regularization parameter of the text classifier model.

* * * * *